US008711770B2

(12) United States Patent
Miki et al.

(10) Patent No.: US 8,711,770 B2
(45) Date of Patent: Apr. 29, 2014

(54) BASE STATION APPARATUS AND COMMUNICATION CONTROL METHOD

(75) Inventors: Nobuhiko Miki, Yokohama (JP); Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 845 days.

(21) Appl. No.: 12/598,126

(22) PCT Filed: Apr. 28, 2008

(86) PCT No.: PCT/JP2008/058196
§ 371 (c)(1),
(2), (4) Date: Oct. 29, 2009

(87) PCT Pub. No.: WO2008/013459
PCT Pub. Date: Nov. 13, 2008

(65) Prior Publication Data
US 2010/0296459 A1 Nov. 25, 2010

(30) Foreign Application Priority Data
May 1, 2007 (JP) .................................. 2007-121304

(51) Int. Cl.
*H04W 72/04* (2009.01)

(52) U.S. Cl.
USPC ............................ 370/328; 370/351; 375/260

(58) Field of Classification Search
USPC ....................... 370/329, 311, 335; 375/260
See application file for complete search history.

(56) References Cited

U.S. PATENT DOCUMENTS

| | | | |
|---|---|---|---|
| 8,077,667 B2 * | 12/2011 | Kuri et al. .................. | 370/329 |
| 2007/0230397 A1 * | 10/2007 | Sakata ........................ | 370/329 |
| 2007/0258358 A1 * | 11/2007 | Cho et al. ................... | 370/208 |
| 2010/0208854 A1 * | 8/2010 | Guess et al. ................ | 375/347 |
| 2010/0260115 A1 * | 10/2010 | Frederiksen et al. ....... | 370/329 |

FOREIGN PATENT DOCUMENTS

| | | | | |
|---|---|---|---|---|
| JP | 2010-506051 | * | 6/2010 | .................. 370/226 |
| JP | 2010-525721 T | | 7/2010 | |
| WO | 2008133440 A1 | | 11/2008 | |

OTHER PUBLICATIONS

Japanese Office Action for Application No. 2010-173497, mailed on Mar. 8, 2011 (6 pages).
Texas Instruments, "Shared Control Channel Structure and Coding for E-UTRA Downlink", 3GPP TSG RAN WG1 LTE Ad Hoc R1-061740, Jun. 27, 2006, pp. 1-8.
Japanese Office Action for Application No. 2007-121304, mailed on Mar. 8, 2011 (5 pages).
International Search Report w/translation from PCT/JP2008/058196 dated Aug. 5, 2008 (4 pages).

(Continued)

*Primary Examiner* — Yemane Mesfin
*Assistant Examiner* — Henry Baron
(74) *Attorney, Agent, or Firm* — Osha Liang LLP

(57) ABSTRACT

A base station apparatus used in a mobile communication system to which an OFDM scheme is applied in downlink is provided with: a scheduler configured to perform assignment of radio resources to a user apparatus for each subframe; a control channel generation unit configured to generate a control channel for reporting a result of scheduling by the scheduler to the user apparatus; and a mapping unit configured to map the control channel and a data channel, wherein the control information includes information indicating a radio resource amount used for the control channel, and the mapping unit multiplexes information indicating the radio resource amount used for the control channel into a first OFDM symbol.

13 Claims, 18 Drawing Sheets

(56) References Cited

OTHER PUBLICATIONS

Written Opinion from PCT/JP2008/058196 dated Aug. 5, 2008 (3 pages).

3GPP TSG RAN WG Meeting #47bis, R1-070104; "Downlink L1/L2 Control Signaling Channel Structure: Mapping"; NTT DoCoMo et al.; Jan. 15-19, 2007 (17 pages).

3GPP TSG RAN WG1#47, R1-063222; "Category 0 for the Control Channel in E-UTRA Downlink"; Texas Instruments; Riga, Latvia; Nov. 6-10, 2006 (5 pages).

3GPP TSG RAN WG1 Meeting #47, R1-063323; "Multiplexing Method of Downlink L1/L2 Control Channel with Shared Data Channel in E-UTRA Downlink"; NTT DoCoMo et al.; Riga, Latvia; Nov. 6-10, 2006 (12 pages).

3GPP TSG RAN WG1 Meeting #48bis, R1-071654; "Transmission Interval of Cat.0 Information in E-UTRA Downlink"; NTT DoCoMo et al.; St. Julians, Malta; Mar. 26-30, 2007 (3 pages).

3GPP TSG-RAN WG1 #49, R1-072034; "'Cat0' information structure and multiplexing"; Qualcomm Europe; Kobe, Japan; May 7-11, 2007 (2 pages).

3GPP TR 25.814, V7.0.0, Jun. 2006; "Physical layer aspets for evolved Universal Terrestrial Radio Access (UTRA)"; Jun. 2006 (126 pages).

3GPP TSG RAN WG Meeting #47bis, R1-070103; "Downlink L1/L2 Control Signaling Channel Structure: Coding"; Jan. 2007; 17 pages).

* cited by examiner

FIG.6

| TYPES OF CHANNELS | | | INFORMATION ITEM |
|---|---|---|---|
| BROADCAST CHANNEL | | | MAXIMUM VALUE OF THE NUMBER OF SIMULTANEOUSLY ASSIGNED USERS<br>RESOURCE BLOCK ARRANGEMENT<br>MIMO SCHEME |
| INDIVIDUAL L3 SIGNALING CHANNEL | | | TYPE OF FDM SCHEME<br>PERSISTENT SCHEDULING INFORMATION |
| L1/L2 CONTROL CHANNEL | PART 0 | | TRANSMISSION FORMAT OF L1/L2 CONTROL CHANNEL<br>NUMBER OF SIMULTANEOUSLY ASSIGNED USERS |
| | DOWNLINK DATA TRANSMISSION RELATED INFORMATION | | PAGING INDICATOR |
| | | | DOWNLINK RESOURCE ASSIGNMENT<br>ASSIGNMENT FREQUENCY<br>MIMO INFORMATION<br>(NUMBER OF STREAMS etc.) |
| | | | MIMO PRECODING INFORMATION<br>MODULATION SCHEME<br>PAYLOAD SIZE<br>HARQ INFORMATION<br>CRC INFORMATION |
| | UPLINK DATA TRANS- MISSION RELATED INFOR- MATION | PART 1 | ACK/NACK |
| | | PART 2 | UPLINK RESOURCE ASSIGNMENT<br>MODULATION SCHEME<br>PAYLOAD SIZE<br>TRANSMISSION POWER<br>CRC INFORMATION |
| | | PART 3 | TRANSMISSION TIMING CONTROL BIT |
| | | PART 4 | TRANSMISSION POWER CONTROL BIT |

FIG.10

| PART 0 INFORMATION | RADIO RESOURCE AMOUNT OF L1/L2 CONTROL CHANNEL | |
|---|---|---|
| | PATTERN A | PATTERN B |
| 0(00) | 0.5 OFDM SYMBOL | 1 OFDM SYMBOL |
| 1(01) | 1 OFDM SYMBOL | 2 OFDM SYMBOLS |
| 2(10) | 1.5 OFDM SYMBOL | 2.5 OFDM SYMBOLS |
| 3(11) | 2 OFDM SYMBOLS | 3 OFDM SYMBOLS |

BASE STATION APPARATUS AND COMMUNICATION CONTROL METHOD

TECHNICAL FIELD

The present invention relates to a radio communication system. More particularly, the present invention relates to a base station apparatus and a communication control method.

BACKGROUND ART

3GPP that is a standardization group of W-CDMA is studying a communication scheme that becomes a successor to W-CDMA and HSDPA, that is, 3GPP is studying Long Term Evolution (LTE). As radio access schemes, OFDM (Orthogonal Frequency Division Multiplexing) is being studied for downlink, and SC-FDMA (Single-Carrier Frequency Division Multiple Access) is being studied for uplink (refer to non-patent document 1, for example).

OFDM is a scheme for dividing a frequency band into a plurality of narrow frequency bands (subcarriers) so as to perform transmission by carrying data on each subcarrier. By arranging the subcarriers on frequencies densely without interfering with each other while a part of them overlap, high speed transmission is realized so that efficiency of use of frequency increases.

SC-FDMA is a transmission scheme that can decrease interference among terminals by dividing frequency band and performing transmission using frequency bands that are different among a plurality of terminals. Since the SC-FDMA has characteristics that variation of transmission power becomes small, low power consumption in the terminal and wide coverage can be realized.

LTE is a system in which a plurality of user apparatuses share one or more physical channels in the uplink and the downlink for performing communication. The channel shared by the plurality of user apparatuses is generally called a shared channel. In LTE, the channel is the Physical Uplink Shared Channel (PUSCH) in the uplink, and is the Physical Downlink Shared Channel (PDSCH) in the downlink.

In the communication system using the above-mentioned shared channel, it is necessary to signal information indicating which user apparatus is assigned the shared channel for each subframe (1 ms in LTE). In LTE, a control channel used for the signaling is called Physical Downlink Control Channel (PDCCH) or called Downlink L1/L2 Control Channel (DL L1/L2 Control Channel). Information of the physical downlink control channel includes, for example, downlink (DL) scheduling information, acknowledgement information (ACK/NACK), uplink (UL) scheduling grant, overload indicator, transmission power control command bit and the like (refer to non-patent document 2, for example).

The DL scheduling information and the UL scheduling grant correspond to the information for signaling which user apparatus is assigned the shared channel. The DL scheduling information includes, for example, assignment information of resource blocks in downlink, ID of UE, the number of streams, information on precoding vector, data size, modulation scheme, information on HARQ (hybrid automatic repeat request), and the like with respect to the downlink shared channel. The UL scheduling grant includes, for example, assignment information of resource blocks in uplink, ID of UE, data size, modulation scheme, uplink transmission power information, demodulation reference signal in uplink MIMO, and the like with respect to the uplink shared channel.

In the following, communications using the uplink shared channel are described.

As mentioned above, in the uplink, the base station apparatus selects, in each subframe (every 1 ms), a user apparatus which performs communication using the shared channel, and instructs the selected user apparatus, by using the uplink scheduling grant, to perform communication using the shared channel in a predetermined subframe. The user apparatus transmits the shared channel based on the uplink scheduling grant. The base station apparatus receives the shared channel transmitted from the user apparatus, and decodes the channel. The above-mentioned processing for selecting a user apparatus which performs communication using the shared channel is called scheduling processing.

[Non-patent document 1] 3GPP TR 25.814 (V7.0.0), "Physical Layer Aspects for Evolved UTRA," June 2006

[Non-patent document 2] R1-070103, Downlink L1/L2 Control Signaling Channel Structure: Coding

[Non-patent document 3] 3GPP, R1-071654, NTT DoCoMo, Mitsubishi Electric, Sharp, "Transmission Interval of Cat. 0 information in E-UTRA Downlink", March, 2007

DISCLOSURE OF THE INVENTION

Problem to be Solved by the Invention

However, the above-mentioned background technique has the following problem.

It is proposed that the L1/L2 control channel includes so-called part 0 information (Cat. 0 information) which is the radio resource amount of the L1/L2 control channel (refer to non-patent document 3, for example). Further, it is agreed that, in terms of the transmission interval of the part 0 information, the part 0 information is transmitted every TTI.

However, mapping positions of the part 0 information in the time-frequency domain are not studied.

In view of the above-mentioned problem, an object of the present invention is to provide a base station apparatus and a communication control method that can report a radio resource amount used for a control channel.

Means for Solving the Problem

In order to overcome the above problem, one aspect of the present invention relates to a base station apparatus used in a mobile communication system to which an OFDM scheme is applied in downlink, including:

a scheduler configured to perform assignment of radio resources to a user apparatus for each subframe;

a control channel generation unit configured to generate a control channel for reporting a result of scheduling by the scheduler to the user apparatus; and a mapping unit configured to map the control channel and a data channel, wherein the control information includes information indicating a radio resource amount used for the control channel, and the mapping unit multiplexes information indicating the radio resource amount used for the control channel into a first OFDM symbol.

Another aspect of the present invention relates to a communication control method in a base station apparatus used in a mobile communication system to which an OFDM scheme is applied in downlink, including:

a scheduling step of performing assignment of radio resources to a user apparatus for each subframe;

a control channel generation step of generating a control channel for reporting a result of scheduling of the scheduling step to the user apparatus; and a mapping step of mapping the control channel and a data channel, wherein, in the mapping step, information that is included in control information and that indicates a radio resource amount used for the control channel is multiplexed into a first OFDM symbol.

Effect of the Present Invention

According to the present invention, a base station apparatus and a communication control method that can report a radio resource amount used for a control channel can be realized.

BRIEF DESCRIPTION OF THE DRAWINGS

FIG. 6 is an explanatory diagram showing information item examples of the control signaling channel;

FIG. 10 is an explanatory diagram showing correspondence between the part 0 information and the radio resource amount of the L1/L2 control channel;

Figure 1:
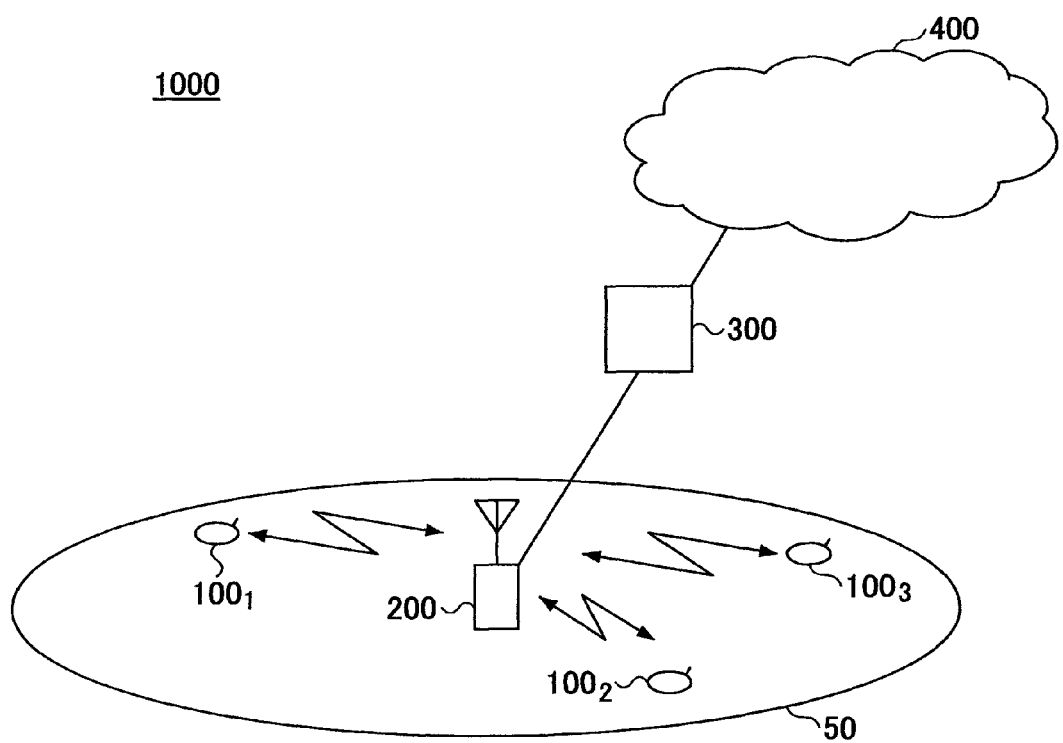
FIG. 1 is a block diagram showing a configuration of a radio communication system of an embodiment of the present invention.

DESCRIPTION OF REFERENCE SIGNS 31 frequency block assignment control unit
32 frequency scheduling unit
33-*x* unit for generating control signaling channel in frequency block x
34-*x* unit for generating data channel in frequency block x
35 broadcast channel (or paging channel) generation unit
1-*x* first multiplexing unit relating to frequency block x
37 second multiplexing unit
38 third multiplexing unit
39 other channel generation unit
40 inverse fast Fourier transform unit
41 cyclic prefix adding unit
41 L1/L2 control channel generation unit
42 L1/L2 control channel generation unit
43 multiplexing unit
81 carrier frequency tuning unit
82 filtering unit
83 cyclic prefix removing unit
84 fast Fourier transform unit (FFT)
85 CQI measurement unit
86 broadcast channel decoding unit
87 L1/L2 control channel (part 0) decoding unit
88 L1/L2 control channel decoding unit
89 data channel decoding unit
50 cell
$100_1, 100_2, 100_3, 100_n$ user apparatus
200 base station apparatus
300 access gateway apparatus
400 core network
1000 radio communication system

PREFERRED EMBODIMENTS FOR CARRYING OUT THE INVENTION

In the following, embodiments of the present invention are described with reference to figures. In all of the figures for explaining embodiments, the same reference symbols are used for parts having the same function, and repeated descriptions are not given.

A mobile communication system to which the user apparatus and the base station apparatus of an embodiment of the present invention is applied is described with reference to FIG. 1.

The radio communication system 1000 is a system to which Evoled UTRA and UTRAN (Another name: Long Term Evolution, or Super 3G) is applied, for example. The radio communication system 1000 includes a base station apparatus (eNB: eNode B) 200 and a plurality of user apparatuses (UE: User Equipment) $100_n$ ($100_1, 100_2, 100_3, \ldots 100_n$, n is an integer and n>0). The base station apparatus 200 is connected to an upper station, that is, an access gateway apparatus 300, for example, and the access gateway apparatus 300 is connected to a core network 400. The user apparatus $100_n$ is communicating with the base station apparatus 200 by Evolved UTRA and UTRAN in a cell 50.

In the following, since the user apparatuses ($100_1, 100_2, 100_3, \ldots 100_n$) have the same configurations, functions and states, a user apparatus $100_n$ is described unless otherwise mentioned. For the sake of convenience of explanation, although the entity which communicates with the base station apparatus by radio is the user apparatus, it includes a mobile terminal and a fixed terminal more generally.

As radio access schemes, the radio communication system 1000 uses OFDM (orthogonal frequency division multiplexing) in the downlink, and uses SC-FDMA (single carrier-frequency division multiple access) in the uplink. As mentioned above, OFDM is a multi-carrier transmission scheme in which a frequency band is divided into a plurality of narrow frequency bands (subcarriers) so that transmission is performed by mapping data on each subcarrier. SC-FDMA is a single carrier transmission scheme that can decrease interference among terminals by dividing a frequency band for each terminal and by using different frequency bands with each other by a plurality of terminals.

In the following, communication channels in the Evolved UTRA and UTRAN are described.

In the downlink, the physical downlink shared channel (PDSCH) shared by each user apparatus $100_n$ and the physical downlink control channel (PDCCH) are used. The physical downlink control channel is also called a downlink L1/L2 control channel. User data, that is, a normal data signal is transmitted by the physical downlink shared channel. Also, the physical downlink control channel transmits downlink scheduling information, acknowledgment information (ACK/NACK), uplink scheduling grant, overload indicator, transmission power control command bit and the like.

The DL scheduling information includes, for example, ID of a user performing communication using the physical downlink shared channel, information of transport format of the user data, that is, information related to data size, modulation scheme and HARQ, and includes assignment information of downlink resource blocks, and the like.

The UL scheduling grant includes, for example, ID of a user performing communication using the physical uplink shared channel, information of transport format of the user data, that is, information related to data size and modulation scheme, and includes assignment information of the uplink resource blocks, information on transmission power of the uplink shared channel, and the like. The uplink resource block corresponds to frequency resources, and is also called a resource unit.

The acknowledgement information (ACK/NACK) is acknowledgement information on the uplink shared channel.

In the uplink, the physical uplink shared channel (PUSCH) shared by each mobile station $100_n$ and the physical uplink control channel are used. The physical uplink shared channel transmits user data, that is, the normal data signal. In addition, the physical uplink control channel transmits downlink quality information (CQI: Channel Quality Indicator) used for scheduling processing for the physical downlink shared channel and for the adaptive modulation and coding scheme (AMCS), and transmits acknowledgment information of the physical downlink shared channel. The contents of the acknowledgment information are represented as either one of Acknowledgement (ACK) indicating that a transmission signal has been properly received or Negative Acknowledgement (NACK) indicating that the signal has not been properly received.

In addition to the CQI and the acknowledgement information, the physical uplink control channel may transmit a scheduling request requesting resource assignment of the uplink shared channel, resource request in persistent scheduling, and the like. The resource assignment of the uplink shared channel means that the base station apparatus reports, using the physical downlink control channel of a subframe, information to the user apparatus indicating that the user apparatus is permitted to perform communication using the uplink shared channel in a following subframe.

Figure 2:
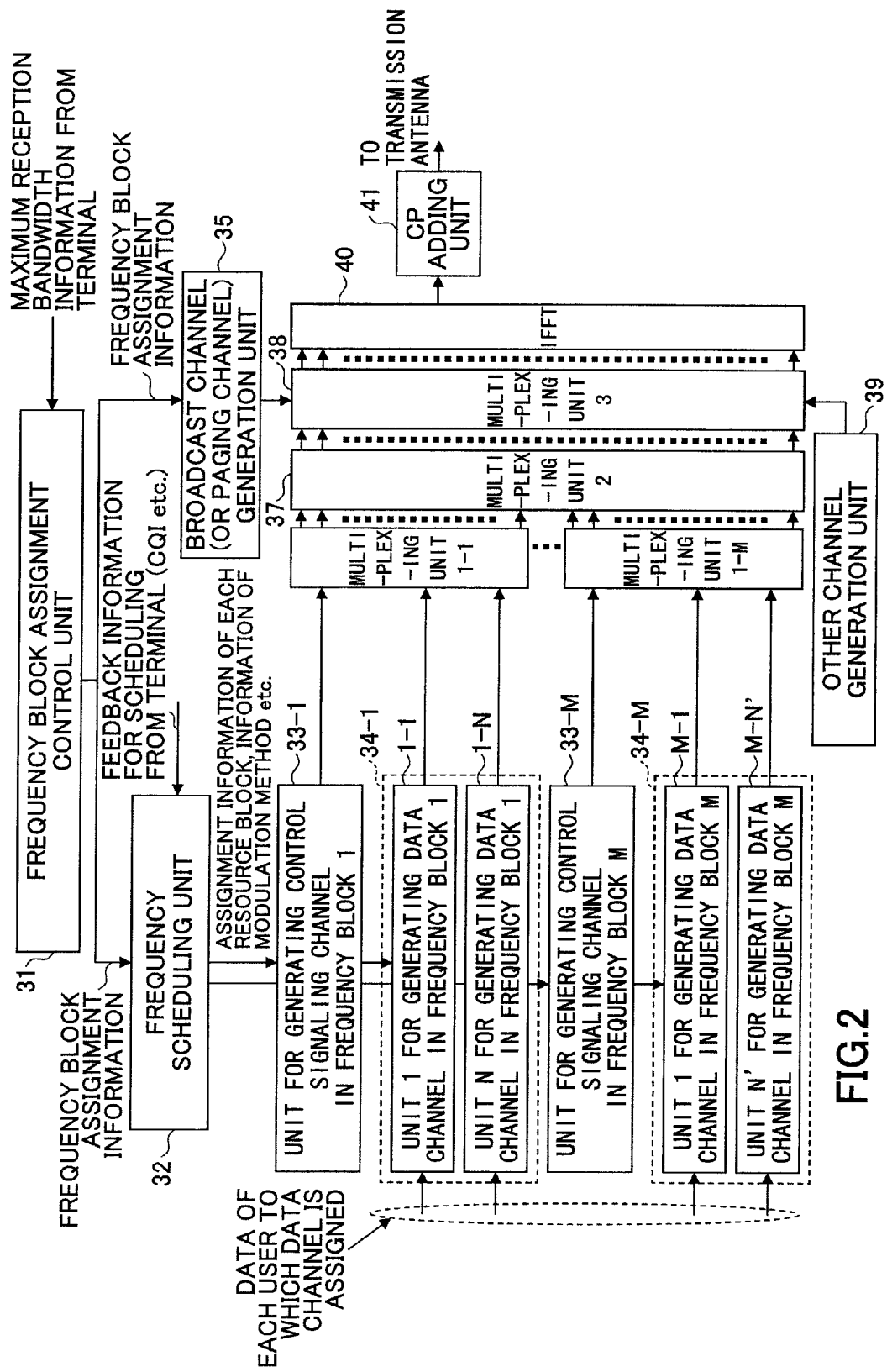
FIG. 2 is a partial block diagram showing a base station apparatus of an embodiment of the present invention.

FIG. 2 shows a partial block diagram of the base station apparatus according to an embodiment of the present invention. FIG. 2 shows a frequency block assignment control unit 31, a frequency scheduling unit 32, a unit 33-1 for generating control signaling channel and a unit 34-1 for generating data channel a frequency block 1, . . . , a unit 33-M for generating control signaling channel and a unit 34-M for generating data channel in a frequency block M, a broadcast channel (or paging channel) generation unit 35, a first multiplexing unit 1-1 for the frequency block 1, . . . , a first multiplexing unit 1-M for the frequency block M, a second multiplexing unit 37, a third multiplexing unit 38, an other channel generation unit 39, an inverse fast Fourier transform unit 40 (IFFT), and a cyclic prefix (CP) adding unit 41.

The frequency block assignment control unit 31 identifies frequency blocks to be used by a user apparatus $100_n$ based on information relating to the maximum bandwidth available for communication reported from the user apparatus $100_n$ (which may be either a mobile terminal or a fixed terminal). The frequency block assuagement control unit 31 manages correspondence relationship between individual user apparatuses $100_n$ and frequency blocks, and reports the information of the correspondence relationship to the frequency scheduling unit 32. Which frequency block can be used for communication by a user apparatus $100_n$ that performs communication using a bandwidth may be reported by using a broadcast channel beforehand. For example, the broadcast channel may permit a user apparatus $100_n$ which performs communication using a bandwidth of 5 MHz to use any one of bands of frequency blocks 1, 2, 3 and 4, or the use of bands may be restricted to one of the frequency blocks 1, 2, 3 and 4. In addition, a user apparatus $100_n$ that performs communication using a bandwidth of 10 MHz is permitted to use a combination of two adjacent frequency blocks such as frequency blocks of (1,2), (2,3) and (3,4). All of these may be permitted to use, or, the use of bands may be restricted to any one of the combinations.

A user apparatus $100_n$ that performs communication using a bandwidth of 15 MHz is permitted to use a combination of three adjacent frequency blocks such as frequency blocks of (1,2,3) or (2,3,4). Both of the frequency blocks may be permitted to use, or, use may be restricted to one of the combinations. A user apparatus $100_n$ that performs communication using a bandwidth of 20 MHz is permitted to use all frequency blocks. Usable frequency blocks may be changed according to a predetermined hopping pattern after communication starts.

The frequency scheduling unit 32 performs frequency scheduling in each of frequency blocks. In frequency scheduling in one frequency block, scheduling information is determined based on channel state information CQI of each resource block reported from user apparatuses $100_n$ such that resource blocks are preferentially assigned to a user apparatus $100_n$ corresponding to a good channel state.

The unit 33-1 for generating the control signaling channel in a frequency block 1 forms a control signaling channel for reporting scheduling information within the frequency block 1 to the user apparatus $100_n$. Similarly, for other frequency blocks, only by using resource blocks in the frequency block a control signaling channel is formed for reporting scheduling information within the frequency block to the user apparatus $100_n$.

The unit 34-1 for generating a data channel in the frequency block 1 generates a data channel transmitted by using one or more resource blocks within the frequency block 1. Since the frequency block 1 can be shared by one or more user apparatuses (users), N units 1-1-N for generating the data channel are prepared. Similarly, also for other frequency blocks, data channels of user apparatuses that share the frequency block are generated.

The first multiplexing unit 1-1 for the frequency block 1 multiplexes signals relating to the frequency block 1. The multiplexing includes at least frequency multiplexing. How the control signaling channel and the data channel are multiplexed is described later. Similarly, other first multiplexing unit 1-x multiplexes the control channel and the data channel transmitted by the frequency block x.

The second multiplexing unit 37 changes position relationships of various multiplexing units 1-x (x=1, . . . , M) on the frequency axis according to a predetermined hopping pattern.

The broadcast channel (or paging channel) generation unit 35 generates broadcast information such as office data to be reported to belonging user apparatuses $100_n$. The control information may include information indicating relationship between maximum frequency band by which the user apparatus $100_n$ can perform communication and frequency blocks that can be used by the user apparatuses $100_n$. When the usable frequency block is changed variously, the broadcast information may include information specifying a hopping pattern which indicates how the frequency blocks change. The paging channel may be transmitted using a band which is also used for the broadcast channel, or may be transmitted using a frequency block used by each user apparatus $100_n$.

The other channel generation unit 39 generates channels other than the control signaling channel and the data channel. For example, the other channel generation unit 39 generates a pilot channel.

The third multiplexing unit 38 multiplexes the control signaling channel and the data channel of each frequency block with the broadcast channel and/or the other channel as necessary.

The inverse fast Fourier transform unit 40 performs inverse fast Fourier transform on the signal output from the third multiplexing unit 38 in order to perform modulation in the OFDM scheme.

The cyclic prefix (CP) adding unit 41 adds a guard interval to a symbol on which modulation of the OFDM scheme has been applied so as to generate a transmission symbol. For example, the transmission symbol may be generated by adding a series of data of an end (or top) of an OFDM symbol to the top (or the end).

Figure 3:
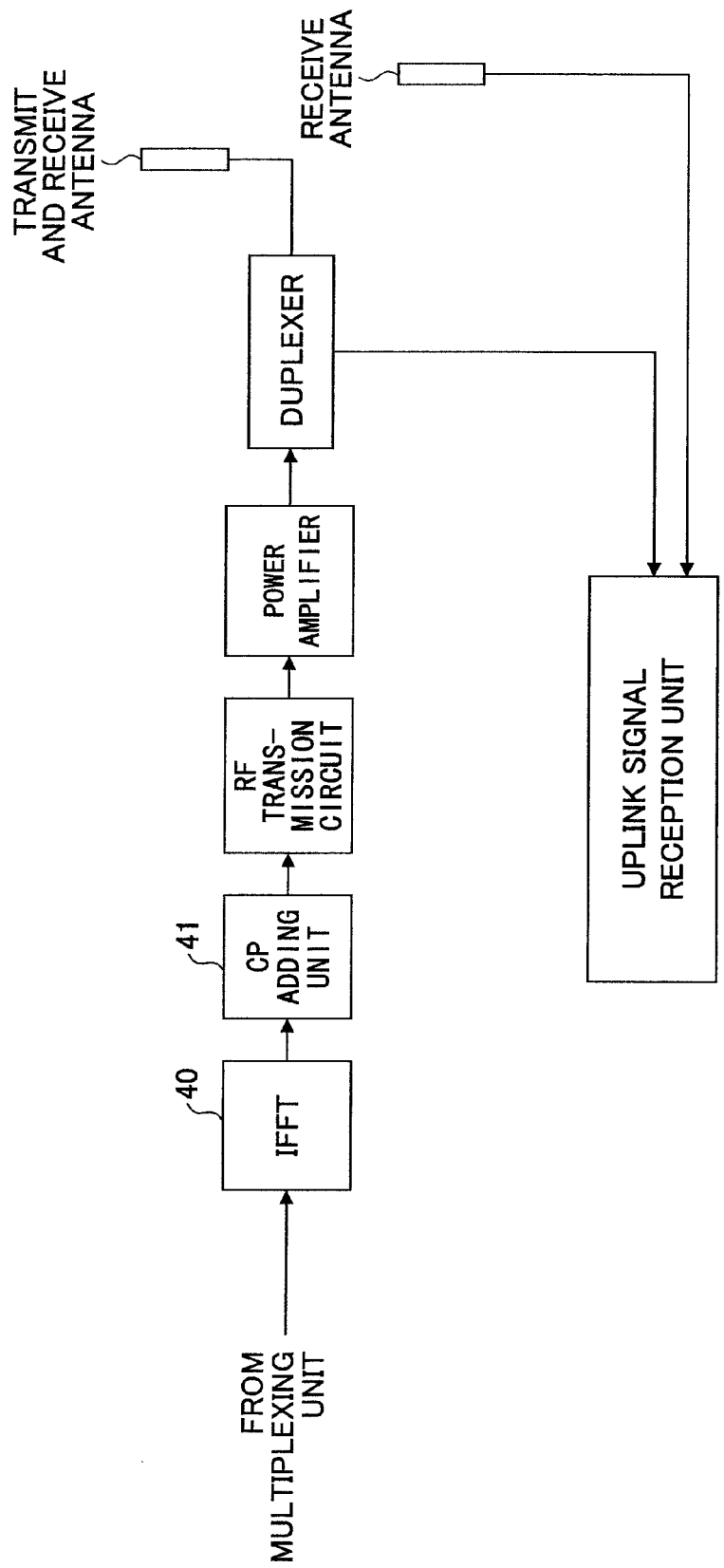
FIG. 3 is a partial block diagram showing a base station apparatus of an embodiment of the present invention.

FIG. 3 shows components following the CP adding unit 41 shown in FIG. 2. The symbol to which the guard interval has been added is amplified to proper power by the power amplifier after being processing by the RF transmission circuit which performs digital-analog conversion, frequency conversion and band limitation and the like, so that the symbol is transmitted via the duplexer and the transmit and receive antenna.

Although not essential for the present invention, antenna diversity reception using two antennas is performed when receiving signals in the present embodiment. An uplink signal received by two antennas is input to an uplink signal reception unit.

Figure 4:
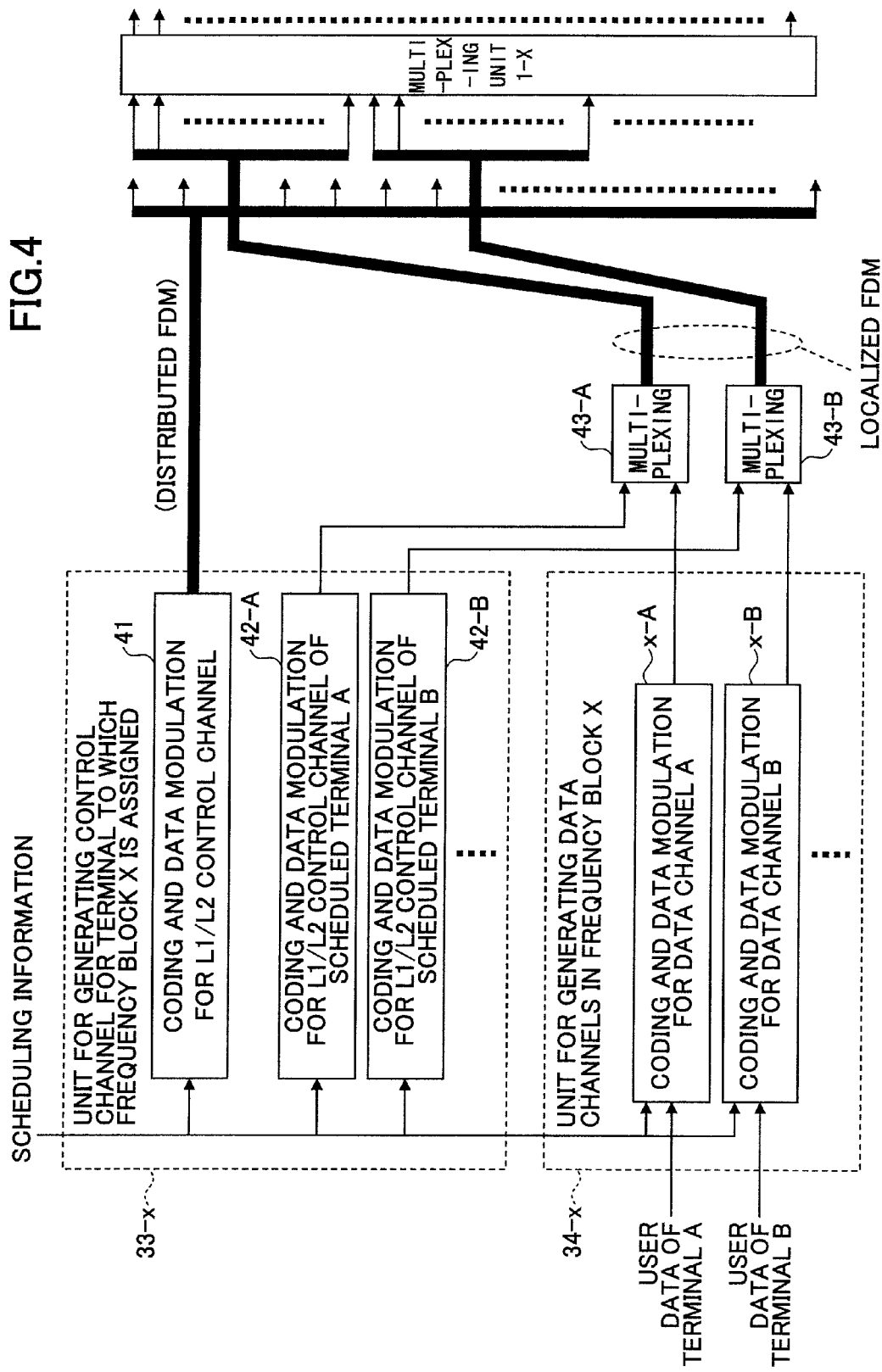
FIG. 4 is a partial block diagram showing signal processing components relating to one frequency block.

FIG. 4 shows signal processing components relating to one frequency block (x-th frequency block), in which "x" is an integer equal to or greater than 1 and equal to or less than M. In summary, FIG. 4 shows the unit 33-*x* for generating control signaling channel and the unit 34-*x*, the multiplexing units 43-A and B, and the multiplexing unit 1-*x*, which are related to the frequency block x. The unit 33-*x* for generating control signaling channel includes a L1/L2 control channel generation unit 41 and one or more L1/L2 control channel generation units 42-A, B, . . . .

The L1/L2 control channel generation unit 41 performs channel coding and multilevel modulation on a part of the L1/L2 control channel in the control signaling channel in which every terminal using the frequency block should decode and modulate the part of the L1/L2 control channel, and outputs the part of the L1/L2 control channel.

The L1/L2 control channel generation unit 42-A, B, . . . , performs channel coding and multilevel modulation on a part of the L1/L2 control channel in the control signaling channel, in which a user apparatus $100_n$ to which one or more resource blocks in the frequency block are assigned should decode and modulate the part of the L1/L2 control channel.

The data channel generation units x-A, B, . . . perform channel coding and multilevel modulation on data channels to terminals A, B, respectively. Information on the channel coding and the multilevel modulation is included in the specific control channel.

The multiplexing units 43-A, B, . . . associate the L1/L2 control channel and the data channel with resource blocks for each terminal to which resource blocks are assigned.

Figure 5:
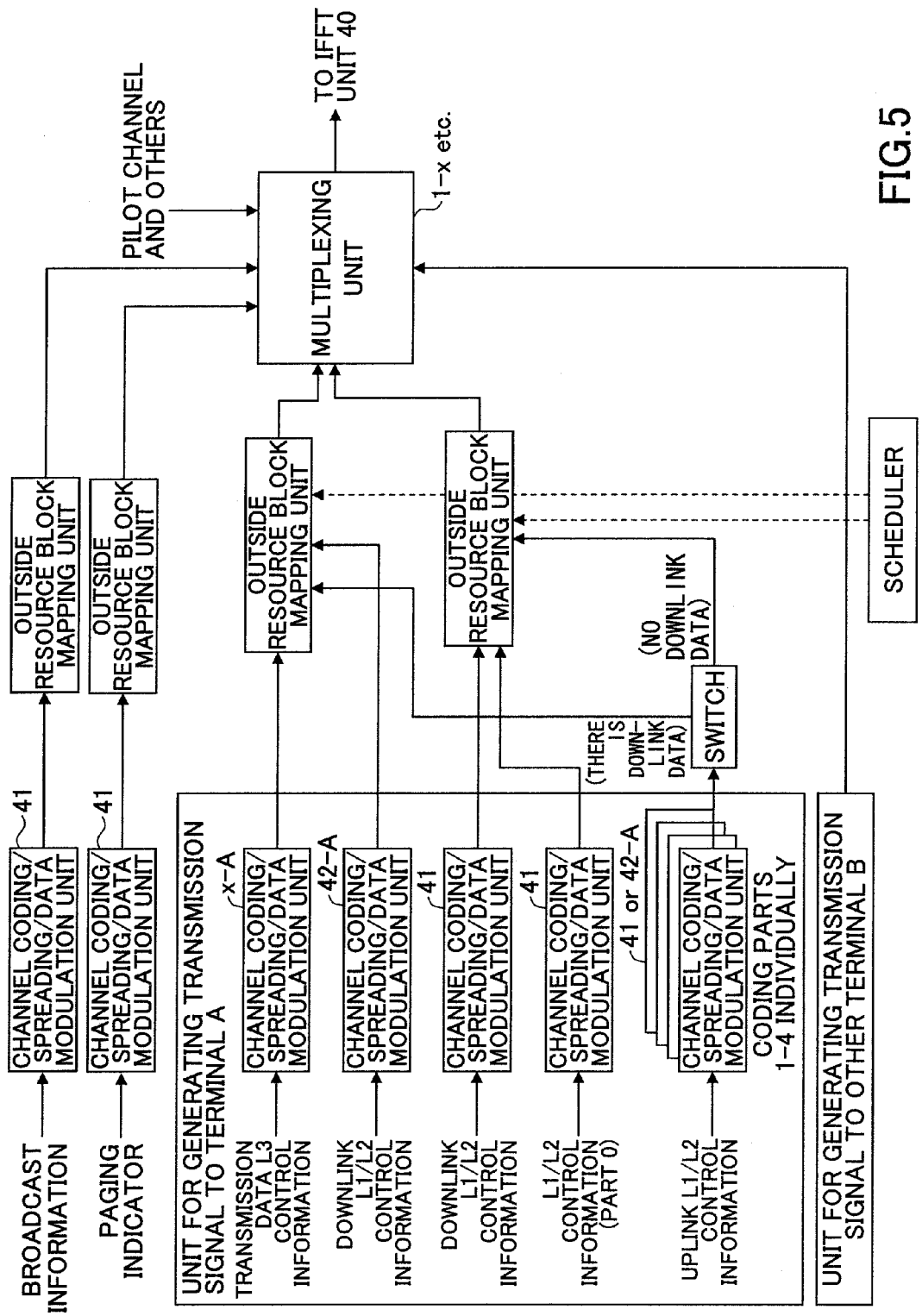
FIG. 5 is a partial block diagram showing signal processing components relating to one frequency block.

Like FIG. 4, FIG. 5 shows signal processing components relating to one frequency block. FIG. 5 is different from FIG. 4 in that individual pieces of control information are concretely shown. The same reference symbols show the same components in FIGS. 4 and 5. In the figure, "inside resource block mapping" indicates mapping only to one or more resource blocks assigned to a specific communication terminal. The "outside resource block mapping" indicates mapping to the whole area of the frequency block including many resource blocks. Part 0 in the L1/L2 control channel is transmitted by the whole area of the frequency block. When resources are assigned for the downlink data channel, information related to uplink data transmission in the L1/L2 control channel is transmitted using the resources. The information is transmitted by the whole area of the frequency block when the resources for the downlink data channel are not assigned.

FIG. 6 shows examples of types and information items of the downlink control signaling channel. The downlink control signaling channel includes broadcast channel (BCH), individual L3 signaling channel (upper layer control channel or higher layer control channel), and L1/L2 control channel (lower layer control channel). The L1/L2 control channel may include not only information for downlink data transmission but also information for uplink data transmission. In addition, the L1/L2 control channel may include transmission format data of the L1/L2 control channel (data modulation scheme, channel coding rate, number of simultaneously assigned users, etc.). In the following, information items transmitted by each channel are described.

(Broadcast Channel)

The broadcast channel is used for reporting, to communication terminals, unchanging information or information changing only at low speed in a cell, wherein the communication terminals may be mobile terminals or fixed terminals, and may be called user apparatuses. For example, information which changes in a period of about 1000 ms (1 second) may be reported as broadcast information. The broadcast information may include the maximum number of simultaneously assigned users, resource block arrangement information and MIMO scheme information.

The maximum number of simultaneously assigned users (user multiplexing number) indicates how many uses are multiplexed as control information in the downlink L1/L2 control channel of one subframe. This number may be specified for each of the uplink and the downlink separately ($N_{U\_MAX}$, $N_{DMAX}$), or may be represented as a total value ($N_{all}$) of the uplink and the downlink.

The maximum number of simultaneously assigned users indicates the maximum number of users that can be multiplexed in 1 TTI using one or more of FDM, CDM and TDM. This number may be the same or different between the uplink and the downlink.

The resource block arrangement information is information for specifying positions of resource blocks, used in the cell, on frequency and time axes. In the present embodiment, two types of frequency division multiplexing (FDM) schemes can be used, which are a localized FDM scheme and a distributed FDM scheme. In the localized FDM scheme, a user of a good channel state locally on the frequency axis is assigned a consecutive band in priority. This scheme is advantageous for communication by a user having small mobility and advantageous for data transmission of high quality and large capacity, and the like. In the distributed FDM scheme, the downlink signal is generated such that the downlink signal includes a plurality of intermittent frequency components over a wideband. This scheme is advantageous for communication by a user having large mobility and advantageous for periodical data transmission of small data size such as voice packet communication (VoIP), and the like. Regardless whether which scheme is used, frequency resources are assigned according to information for specifying consecutive band or discrete frequency components.

The MIMO scheme information indicates which of the Single User—Multi Input Multi Output (SU-MIMO) scheme and the Multi—User MIMO (MU-MIMO) scheme is used when the base station apparatus is provided with a plurality of antennas. The SU-MIMO scheme is a scheme in which a communication terminal having a plurality of antennas communicates with a base station apparatus having a plurality of antennas. The MU-MIMO scheme is a scheme in which the base station apparatus communicates with a plurality of communication terminals simultaneously.

In the downlink MU-MIMO scheme, a signal is transmitted from one or more antennas (a first antenna of two antennas, for example) of the base station apparatus to a user apparatus $UE_A$, and a signal is transmitted from other one or more antennas (a second antenna of two antennas, for example) to another user apparatus $UE_B$. In the uplink MU-MIMO scheme, a plurality of antennas of the base station apparatus simultaneously receive a signal from a user apparatus $UE_A$ and a signal from another user apparatus $UE_B$. Signals from each user apparatus may be identified by using reference signals assigned to each user apparatus. It is desirable to use CAZAC code sequence as the reference signal for that purpose. The reason is that, since even same CAZAC code sequences are orthogonal with each other when cyclic shift amounts are different, orthogonal sequences can be easily prepared, for example.

(Individual L3 Signaling Channel)

The individual L3 signaling channel is also used for reporting information, to a communication terminal, that changes at low speed, that is, at a period of 1000 ms, for example. Although the broadcast channel is reported to all communication terminals in the cell, the individual L3 signaling channel is reported only to a specific communication terminal. The individual L3 signaling channel includes the type of the FDM scheme and persistent scheduling information.

The type of the FDM scheme specifies which of the localized FDM scheme and the distributed FDM scheme is used for multiplexing specified individual communication terminals.

The persistent scheduling information specifies a transmission format (data modulation scheme and channel coding rate) of uplink or downlink data channel, resource blocks to be used, and the like.

(L1/L2 Control Channel)

The Downlink L1/L2 Control Channel May include not only information related to downlink data transmission but also information related to uplink data transmission. Further, the downlink L1/L2 control channel may include information bit (part 0) indicating a transmission format of the L1/L2 control channel.

(Part 0)

The part 0 information (to be referred to as "part 0" for the sake of simplicity hereinafter) includes the transmission format of the L1/L2 control channel (modulation scheme and channel coding rate, the number of simultaneously assigned users or the number of whole control bits). The part 0 includes the number of simultaneously assigned users (or the number of the whole control bits). In addition, the part 0 information includes information indicating a radio resource amount used for the L1/L2 control channel.

The number of symbols necessary for the L1/L2 control channel depends on the number of the simultaneously multiplexed users and depends on reception quality of the users to be multiplexed. Typically, the number of symbols of the L1/L2 control channel is set to be large enough. For changing the number of symbols, the number can be controlled in a period of about 1000 ms (1 second), for example, according to the transmission format of the L1/L2 control channel reported from the broadcast channel. However, when the number of simultaneously multiplexed users is small, the number of symbols necessary for the control channel can be small. Therefore, if significant amount of resources for the L1/L2 control channel continue to be kept when the number of simultaneously multiplexed users and the reception quality of users to be multiplexed change in a short period, there is a fear that large wastes may occur. For reducing such wastes for the L1/L2 control channel, the part 0 information (modulation scheme, channel coding rate and the number of simultaneously assigned users (or the number of whole control bits)) may be reported in the L1/L2 control channel. By reporting the modulation scheme and the channel coding rate in the L1/L2 control channel, it becomes possible to change the modulation scheme and the channel coding rate in a period shorter than that in reporting by the broadcast channel. When the number of symbols of the L1/L2 control channel in one subframe is limited to some options, the transmission format can be specified by specifying which option is used. For example, as described later, when four patterns of transmission formats are prepared, the part 0 information may be represented by two bits.

(Downlink Data Transmission Related Information)

The downlink data transmission related information includes paging indicator (PI). Each user apparatus $100_n$ demodulates the paging indicator so that the user apparatus $100_n$ can check whether there is a call to the user apparatus $100_n$. More particularly, the user apparatus $100_n$ checks whether a group number assigned to the user apparatus $100_n$ is included in the paging indicator, then, if it is found, the user apparatus $100_n$ demodulates the paging channel (PCH). The position relationship between PI and PCH are set to be known beforehand. The user apparatus $100_n$ can check presence or absence of incoming call by checking whether there is identification information of the user apparatus $100_n$ (telephone number of the user apparatus $100_n$, for example) in the paging channel (PCH).

As schemes for transmitting the paging indicator (PI) by using the L1/L2 control channel, there are a scheme for using an information part specifically prepared for PI in the L1/L2 control channel and a scheme in which such specific information part is not prepared.

The downlink data transmission related information includes resource assignment information of the downlink data channel assignment time length, and MIMO information.

The resource assignment information of the downlink data channel specifies resource blocks that include the downlink data channel. For specifying resource blocks, various methods that are known in this technical field can be used. For example, bitmap scheme, tree branch number scheme and the like can be used.

The assignment time length indicates how long the downlink data channel continues to be transmitted consecutively. When resource assignment contents change most frequently, resource assignment contents change every TTI. From the viewpoint of reducing overhead, the data channel may be transmitted using the same resource assignment over a plurality of TTIs.

The MIMO information specifies the number of antennas, the number of streams and the like when the MIMO scheme is used for communication. The number of streams may be called the number of information sequences. Although each of the numbers of the antennas and the streams may be any proper number, it may be four, for example.

Although it is not essential that user identification information is included, the whole or a part of 16 bits of user identification information may be included, for example.

The downlink data transmission related information includes precoding information when the MIMO scheme is used, transmission format of downlink data channel, hybrid retransmission control (HARQ) information and CRC information.

The precoding information for use in the MIMO scheme is used to specify weighting coefficients applied to individual antennas. By adjusting the weighting coefficients (precoding vector) to be applied to each antenna, directivity of a communication signal is adjusted. The reception side (user apparatus) needs to perform channel estimation according to the directivity.

The transmission format of the downlink data channel is specified by the data modulation scheme and the channel coding rate. Instead of the channel coding rate, data size or payload size may be reported, because the channel coding rate can be uniquely derived from the data modulation scheme and the data size. As an example, the transmission format may be represented by about 8 bits.

The hybrid retransmission control (HARQ: Hybrid Automatic Repeat ReQuest) information includes information necessary for retransmission control of downlink packets. More particularly, the retransmission control information includes process number, redundancy version information indicating packet combining method, and new data indicator for distinguishing between new packet and retransmitted packet. As an example, the hybrid retransmission control information may be represented by about 6 bits.

When the cyclic redundancy check method is used for error detection, the CRC information indicates a CRC detection bit to which user identification information (UE-ID) is convolved.

The information related to the uplink data transmission can be classified into four types from part 1 to part 4 as follows.

(Part 1)

Part 1 includes acknowledgement information for a past uplink data channel. The acknowledgement information indicates positive acknowledgement (ACK) or negative acknowledgement (NACK), wherein the positive acknowledgement (ACK) indicates that there is no error in the packet or that, even if there is an error, the error is within a permissible range, and the negative acknowledgement (NACK) indicates that there is an error, in a packet, exceeding the permissible range. The acknowledgement information can be represented by one bit substantially.

(Part 2)

Part 2 includes resource assignment information for future uplink data channel, transmission format of the uplink data channel, transmission power information and CRC information.

The resource assignment information specifies resource blocks that can be used for transmitting an uplink data channel. For specifying the resource blocks, various methods known in this technical field can be used. For example, bitmap scheme, tree branching number scheme and the like may be used.

The transmission format of the uplink data channel is specified by the data modulation scheme and the channel coding rate. Instead of the channel coding rate, data size or payload size may be reported, because the channel coding rate can be uniquely derived from the data modulation scheme and the data size. As an example, the transmission format may be represented by about 8 bits.

The transmission power information indicates degree of power by which the uplink data channel should be transmitted. In an embodiment of the present invention, an uplink pilot channel is transmitted from the user apparatus $100_n$ to the base station apparatus iteratively in a period Tref of about several milliseconds, for example, which is relatively short. The transmission power Pref of the uplink pilot channel is updated in a period of $T_{TPC}$ which is equal to or greater than the period Tref according to transmission power control information (TPC command) reported from the base station apparatus, such that the transmission power Pref becomes no less than or no more than the transmission power of the uplink pilot channel transmitted in the past.

The uplink L1/L2 control channel is transmitted by a power which is obtained by adding a first offset power $\Delta_{L1/L2}$ reported from the base station apparatus to the transmission power Pref of the uplink pilot channel. The uplink data channel is transmitted by a power which is obtained by adding a second offset power $\Delta_{data}$ reported from the base station apparatus to the transmission power Pref of the uplink pilot channel. The offset power $\Delta_{data}$ on the data channel is included in the transmission power information of part 2. The offset power $\Delta_{L1/L2}$ for the L1/L2 control channel is included in the transmission power information of the after mentioned part 4. In addition, TPC command for updating the transmission power of the pilot channel is also included in part 4.

The first offset power information $\Delta_{L1/L2}$ may be kept unchanged or may be variably controlled. In the latter case, the first offset power information may be reported to the user apparatus as broadcast information BCH or as layer 3 signaling information. The second offset power information $\Delta_{data}$ may be reported to the user apparatus using the L1/L2 control signal. The first offset power information $\Delta_{L1/L2}$ may be determined such that the first offset power is increased or decreased according to information amount included in the control signal. The first offset power information $\Delta_{L1/L2}$ may be determined such that it changes according to reception quality of the control signal. The second offset power information $\Delta_{data}$ may be determined such that it changes according to reception quality of the data signal.

The uplink data channel may be transmitted using power which is less than the sum of the transmission power Pref of the uplink pilot channel and the second offset power $\Delta_{data}$, in order to follow a request (overload indicator) of reducing power from neighbor cells of the cell in which the user apparatus $100_n$ resides.

When the cyclic redundancy check method is used for error detection, the CRC information indicates a CRC detection bit to which user identification information (UE-ID) is convolved. In a response signal (L1/L2 control channel) for the random access channel (RACH), a random ID for a RACH preamble may be used as the UE-ID.

(Part 3)

Part 3 includes a transmission timing bit on an uplink signal. This is a control bit for synchronizing communication terminals in a cell. This information may be reported as specific control information when the downlink data channel is assigned a resource block, or the information may be reported as unspecific control information.

(Part 4)

Part 4 includes transmission power information on the transmission power of the communication terminal. This information indicates degree of power by which the uplink control channel should be transmitted for a communication terminal to report downlink CQI, for example, in which the communication terminal is not assigned resources for transmission of the uplink data channel. The offset power $\Delta_{L1/L2}$ and the TPC command are included in the part 4 information.

Figure 7:
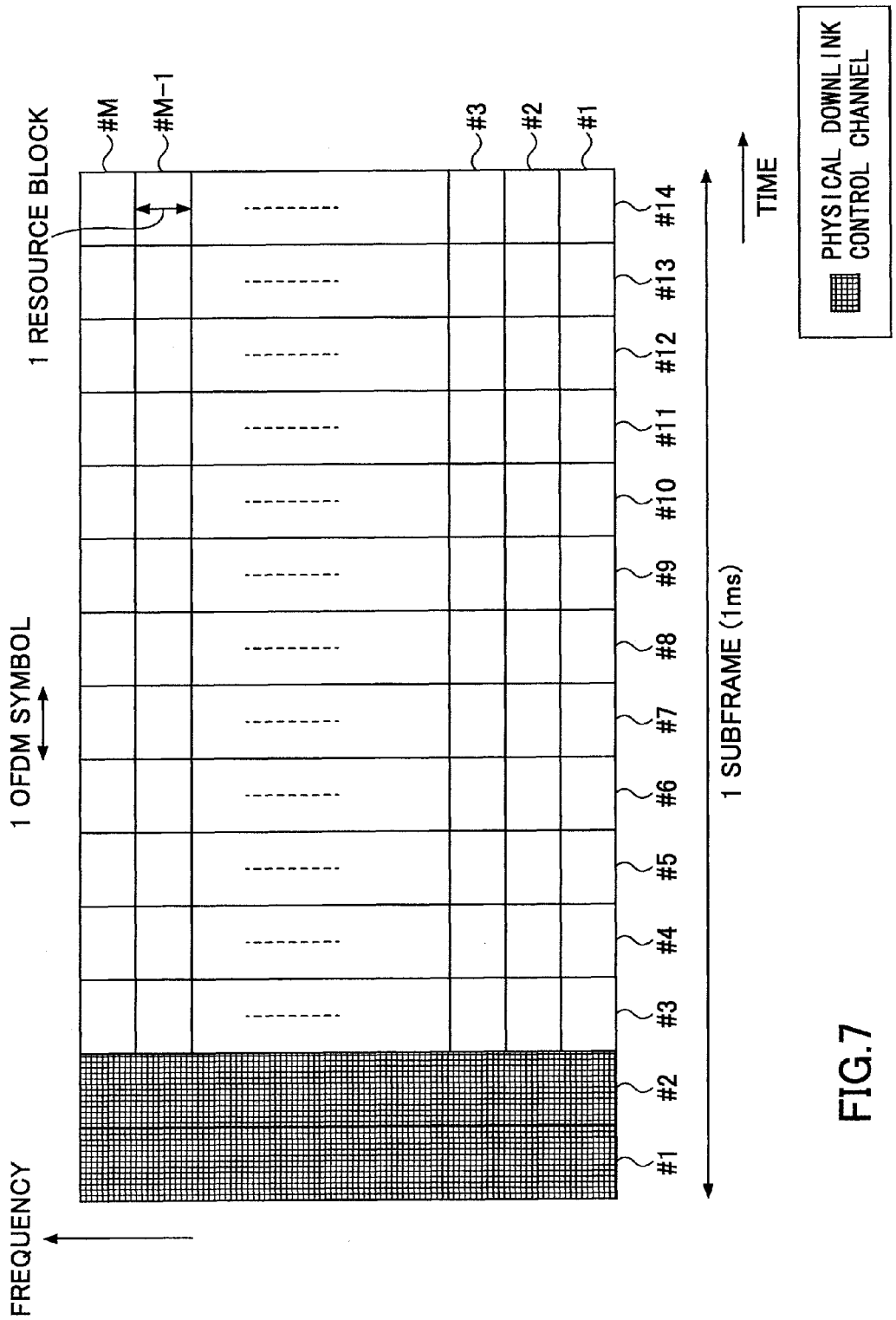
FIG. 7 is an explanatory diagram showing a subframe configuration.

FIG. 7 shows a mapping example of the data channel and the control channel. In the downlink transmission, as shown in FIG. 7, 1 subframe is 1 ms, for example, and 14 OFDM symbols exist in 1 subframe. In FIG. 7, numbers (#1, #2, #3, ... #14) in the time axis direction indicate numbers for identifying OFDM symbols, and the numbers (#1, #2, #3, ... #M−1, #M, M is an integer of M>0) in the frequency axis direction indicate numbers identifying resource blocks. In terms of one frequency block and one subframe, the mapping example shown in the figure corresponds to output information of the first multiplexing unit 1-x. The resource blocks are assigned to a terminal having a good channel state by the frequency scheduling unit 32 shown in FIG. 2.

The physical downlink control channel is mapped to N OFDM symbols in the head part of 1 subframe. As a value of N, 1, 2 or 3 is set. In FIG. 7, the physical downlink control channel is mapped to the head two OFDM symbols (N=2) of the subframe, that is, mapped to OFDM symbols #1 and #2. Then, in OFDM symbols other than the OFDM symbols to which the physical downlink control channel is mapped, user data, synchronization channel (SCH), broadcast channel (BCH), and data signal to which persistent scheduling is applied are transmitted. The L1/L2 control channel and the like and the data channel and the like are time-multiplexed.

In addition, in the frequency direction, M resource blocks are defined. The frequency band of 1 resource block is 180 kHz, for example, and 12 subcarriers exist in 1 resource block. The number M of the resource blocks is 25 when the system bandwidth is 5 MHz, and it is 50 when the system bandwidth is 10 MHz, and it is 100 when the system bandwidth is 20 MHz.

Figure 8:
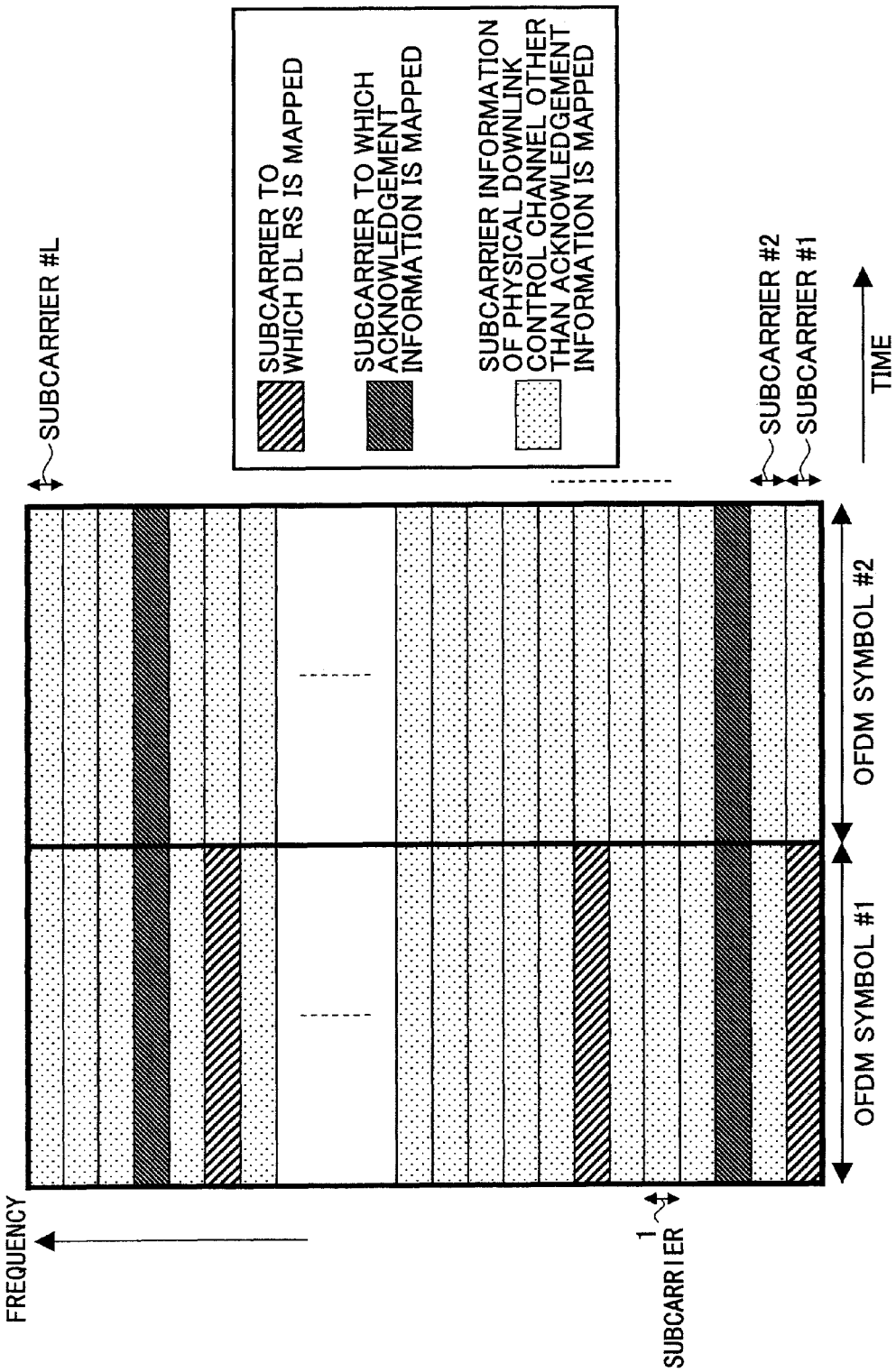
FIG. 8 is an explanatory diagram showing a subcarrier mapping example in OFDM symbols #1 and #2.

FIG. 8 shows a subcarrier mapping example in OFDM symbols #1 and #2 when the subframe has the configuration shown in FIG. 7. In the figure, the number of subcarriers in 1 OFDM symbol is L (L is an integer of L>0), and the subcarriers are numbered as subcarrier #1, #2, ... and #L starting from one of the smallest frequency. When the system bandwidth is 5 MHz, L=300. When the system bandwidth is 10 MHz, L=600. When the system bandwidth is 20 MHz, L=1200. As shown in the figure, the downlink reference signal (DL RS) and the physical downlink control channel are mapped to the subcarrier of OFDM symbol #1. The physical downlink control channel is mapped to the OFDM symbol #2.

Especially, since delay time needs to be small for the part 0 information in the L1/L2 control channel, the part 0 information is multiplexed to the head OFDM symbol. In the example shown in the figure, the L1/L2 control channel and other control channels are frequency-multiplexed such that each of the channels includes a plurality of frequency components which are arranged at some intervals. Such a multiplexing scheme is called distributed frequency division multiplexing (distributed FDM) scheme. The distributed FDM scheme is advantageous in that frequency diversity effect can be obtained. The intervals between frequency components may be identical with each other or different. In any way, the L1/L2 control channel needs to be distributed over the whole region of the plurality of resource blocks (the whole region of the system band in the present embodiment). In addition, as another method, a CDM scheme can be applied in order to support increase of the number of users to be multiplexed. By using the CDM scheme, there is an advantage that the frequency diversity effect further increases. But, on the other hand, there is a drawback that reception quality decreases due to break of orthogonality.

For example, DL RS is transmitted at the rate of one subcarrier per six subcarriers in the OFDM symbol #1. In the figure, DL RS is mapped to subcarrier #6×d−5 (d: 1, 2, ... ). In addition, the physical downlink control cannel is mapped to subcarriers other than the subcarrier to which DL RS is mapped. In the figure, an example of subcarriers is shown in which Acknowledgement information (UL ACK/NACK) is mapped, in information transmitted by the physical downlink control channel. In the figure, an example is shown in which Acknowledgement information (UL ACK/NACK) is mapped to the subcarrier #3 and the subcarrier #L-3. The number of subcarriers to which Acknowledgement information is mapped is determined based on the maximum number of user apparatuses to be multiplexed to one subframe in the uplink, that is, it is determined based on the maximum number of user apparatuses that transmit uplink shared channel in one subframe.

In the case when the number of OFDM symbols to which the physical downlink control channel is mapped is three, the configuration of the OFDM symbol #3 is basically the same as the configuration of the OFDM symbol #2 shown in FIG. 8.

Next, a concrete format of the part 0 information in the L1/L2 control channel is described.

Figure 9:
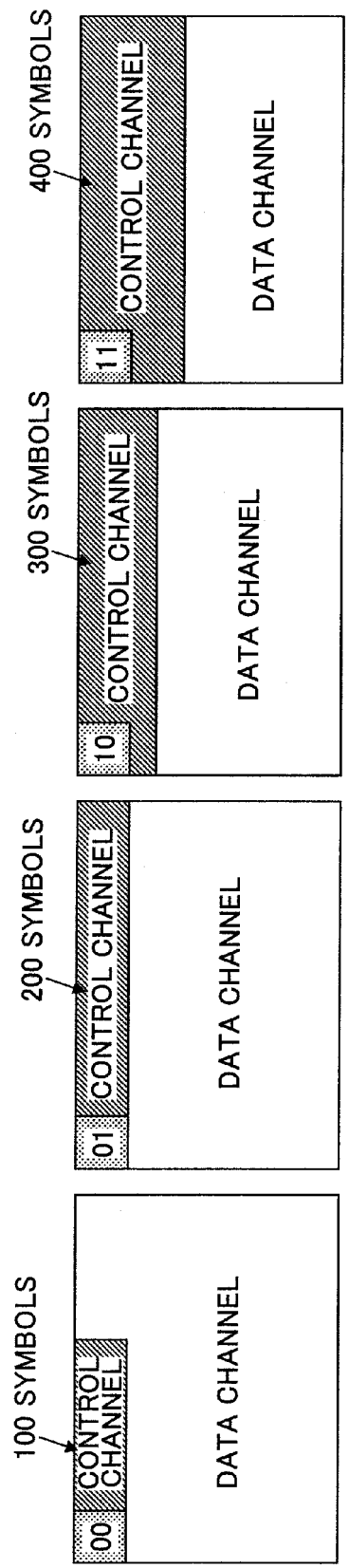
FIG. 9 is an explanatory diagram showing formats of the L1/L2 control channel when the radio resource amount used for the L1/L2 control channel is reported by using the part 0 information.

FIG. 9 shows format examples of the L1/L2 control channel. In the examples shown in the figure, four patterns are prepared as the format of the L1/L2 control channel. The number of symbols (or the number of simultaneously assigned users) of the L1/L2 control channel is different for each pattern. Which one of the four patterns is used is reported by the part 0 information. As described above, the part 0 information indicates the radio resource amount used for the L1/L2 control channel.

Since it is necessary that the part 0 information needs to be received correctly even by a user at a cell edge, there is a possibility that the overhead becomes large. However, the necessary radio resource amount largely depends on the cell radius and the like. Therefore, the system is configured such that the broadcast channel can report the coding rate and the number of times of iteration used for the part 0 information. By configuring like this, the overhead can be decreased.

As to the L1/L2 control channel, when the user apparatus $100_n$ uses the modulation scheme and the coding rate (MCS: Modulation and Coding Scheme) reported by the broadcast channel, the number of symbols necessary for L1/L2 control channel is different according to MCS level depending on the number of simultaneously assigned users. In order to identify that, control bits (two bits in the case shown in FIG. 9) are provided as the part 0 information of the L1/L2 control channel. For example, by reporting control bits of "00" as the part 0 information, the user apparatus $100_n$ decodes the control bits so as to be able to know that the number of symbols of the L1/L2 control channel is 100. The head two bits shown in FIG. 9 correspond to the part 0 information. Although MCS is reported by the broadcast channel in FIG. 9, MCS may be reported by an L3 signaling channel.

In addition, for example, as shown in FIG. 10, as the part 0 information for specifying OFDM symbols to which the L1/L2 control channel is mapped, 0.5, 1, 1.5 and 2 OFDM symbols are assigned respectively to four types of control information represented by two bits. In addition, 1, 2, 2.5 and 3 OFDM symbols may be assigned respectively to four types of control information represented by two bits. The correspondence relationships are merely examples, and can be changed as necessary. In FIG. 10, pattern A and pattern B are shown in which 0.5-2 OFDM symbols are assigned in pattern A and 1-3 OFDM symbols are assigned in pattern B.

Which one of the pattern A and the pattern B is used is reported by broadcast information, for example. In this case, the broadcast information generation unit 35 generates broadcast information including information which indicates the radio resource amount of the L1/L2 control channel corresponding to the control information which specifies OFDM symbols to which the L1/L2 control channel is mapped. The radio resource amount using the L1/L2 control channel also depends on cell radius and the like. Therefore, by configuring the system such that the bit configuration of the part 0 information can be reported, the overhead can be decreased.

Next, transmission method of the part 0 information is described with reference to FIG. 11.

Since the part 0 information includes information indicating the radio resource amount of the L1/L2 control channel, the part 0 information needs to be transmitted as quickly as possible. Therefore, the part 0 information is mapped to the first OFDM symbol. FIG. 11 shows the first OFDM symbol in the subframe configuration shown in FIG. 7. As shown in FIG. 11, a reference signal is mapped every 6 subcarriers at the first OFDM symbol. The part 0 information is mapped to the subframe (resource element) other than the portion where the reference signal is mapped. The 1 resource element is defined by 1 OFDM symbol and 1 subframe.

For example, the part 0 information is mapped every predetermined number of subcarriers, that is, every 12 subcarriers, repeatedly, for example. Also, frequency hopping is performed to change mapping positions of the reference signal for each frame. Therefore, from the viewpoint of reducing collision between the part 0 information and the reference signal, it is desirable that the part 0 information is mapped by shifting it by an amount the same as a shift amount of a mapping position of the reference signal which is shifted from a mapping position of the reference signal in the previous frame. Alternatively, the part 0 information may be shifted only when it collides with the reference signal.

Figure 11:
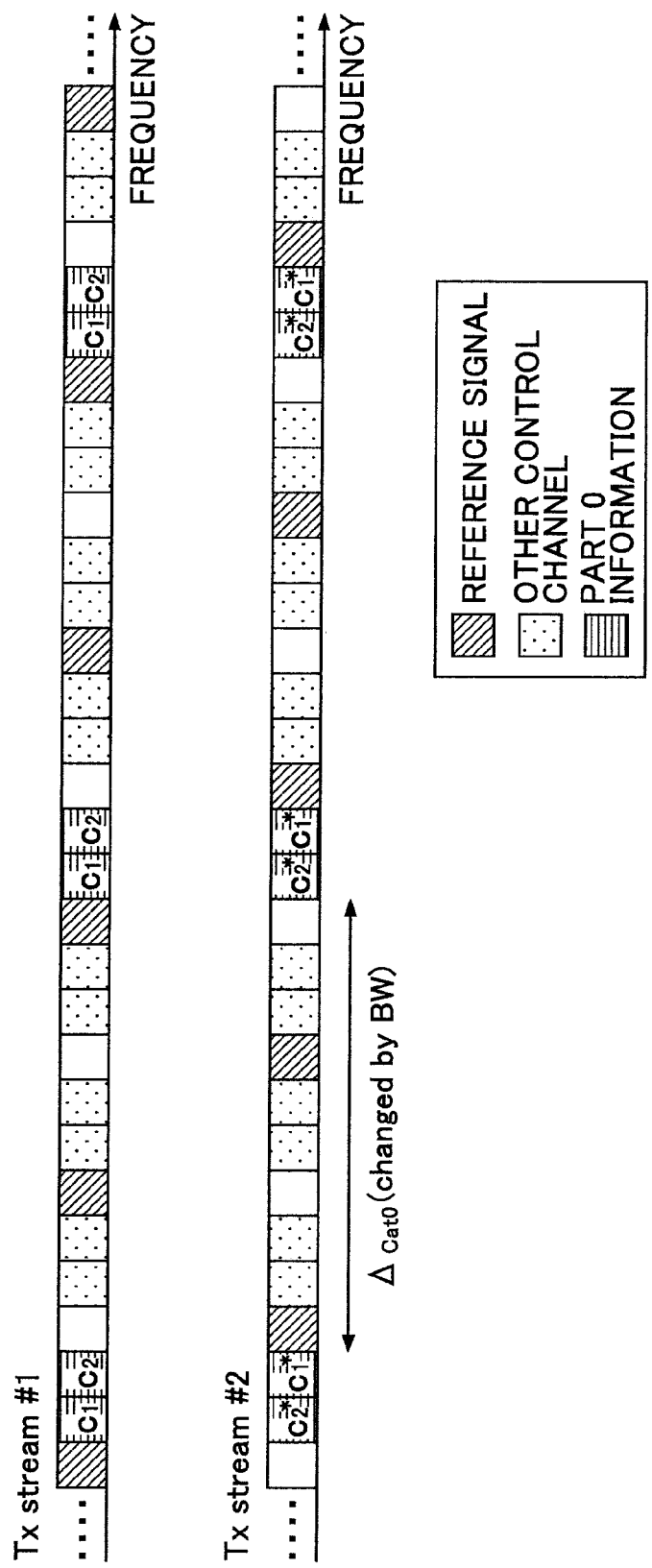
FIG. 11 is an explanatory diagram showing a method for transmitting the part 0 information.

In addition, when space-frequency block coding (SFBC) is applied to the part 0 information so that the part 0 information is transmitted by two antennas, consecutive two subcarriers are assigned to the part 0 information as shown in FIG. 11. Different coding is performed for the two antennas in units of two complex symbols (C1, C2: corresponding to four bits). In FIG. 11, * indicates operation of complex conjugate.

Figure 12:
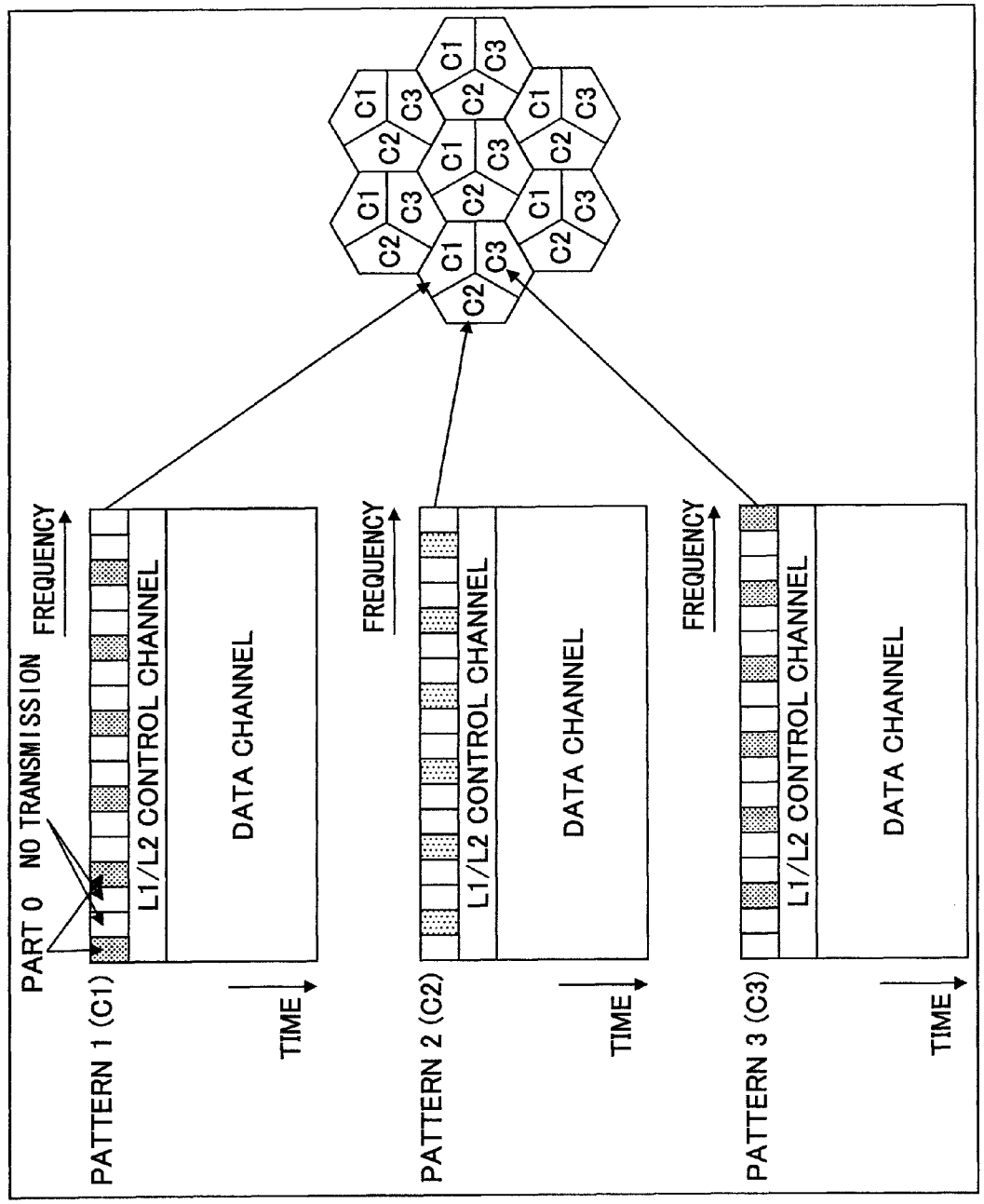
FIG. 12 is an explanatory diagram showing a mapping example of the part 0 information in the L1/L2 control channel in the case of using three sector configuration.

FIG. 12 shows a mapping example of information bits (part 0 information) in the L1/L2 control channel in the case of using three sector configuration. In the case of three sector configuration, three types of patterns may be prepared in order to transmit information bits (part 0 information) indicating transmission format of the L1/L2 control channel, so that each of the patterns may be assigned to one of the sectors such that the patterns do not overlap with each other in the frequency domain. By selecting the pattern such that the transmission patterns in adjacent sectors (or cells) are different with each other, effect of interference coordination can be obtained.

Figure 13:
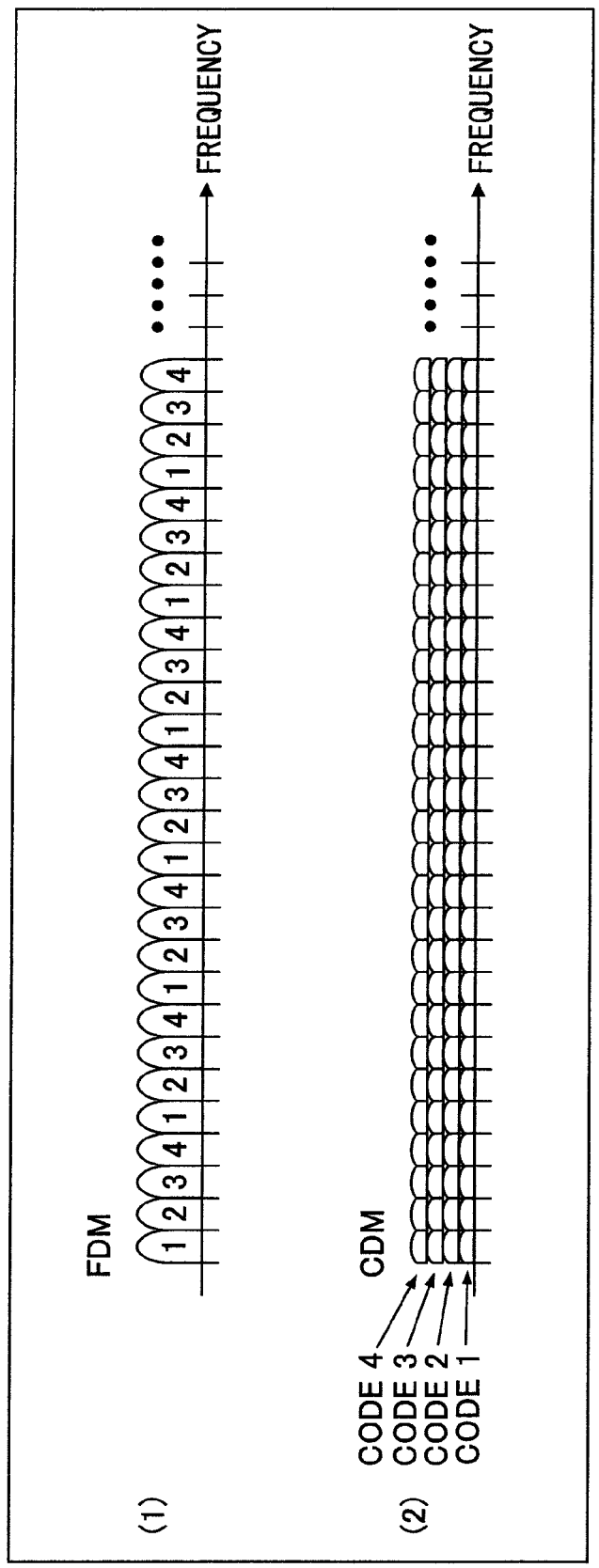
FIG. 13 is an explanatory diagram showing examples of multiplexing schemes for the L1/L2 control channel.

FIG. 13 shows various examples of multiplexing methods. Although the L1/L2 control channels are multiplexed using the distributed FDM scheme in the above-mentioned example, various multiplexing methods such as code division multiplexing (CDM) may be used. FIG. 13(1) shows a situation in which multiplexing is performed using the distributed FDM scheme. By using the numbers of 1, 2, 3 and 4 for specifying discrete frequency components, signals of users can be properly made orthogonal. However, the numbers are not necessarily regularly arranged like this example. In addition, by using different rules between adjacent cells, interference amounts when performing transmission power control can be randomized. FIG. 13(2) shows a situation in which multiplexing is performed using the code division multiplexing (CDM) scheme. By using codes 1, 2, 3 and 4, signals of users can be orthogonalized properly. This scheme is preferable from the viewpoint of effectively reducing other cell interference.

By the way, as to the transmission method of the part 0 information, both of MCS (combination of modulation scheme and channel coding rate) and transmission power applied to the part 0 information may be kept constant, or MCS may be kept constant but transmission power may be controlled variably. Further, the part 0 information may be kept common to all users residing in the cell, or the transmission format of the L1/L2 control channel may be different among users.

For example, for a user near the base station apparatus, the transmission format can be optimized by properly changing the contents of the part 0 information. But, the transmission format may not be changed like this for a user at a cell edge (the format may be kept constant). However, it is necessary that information indicating whether a user belongs to a group of the cell edge is reported to the user using the downlink L1/L2 control channel, for example. If a user does not belong to the group of the cell edge, the part 0 information is reported by a transmission format which is changed properly (every TTI, in an extreme case). If a user belongs to the group of the cell edge, control information is reported using a constant transmission format.

Figure 14:
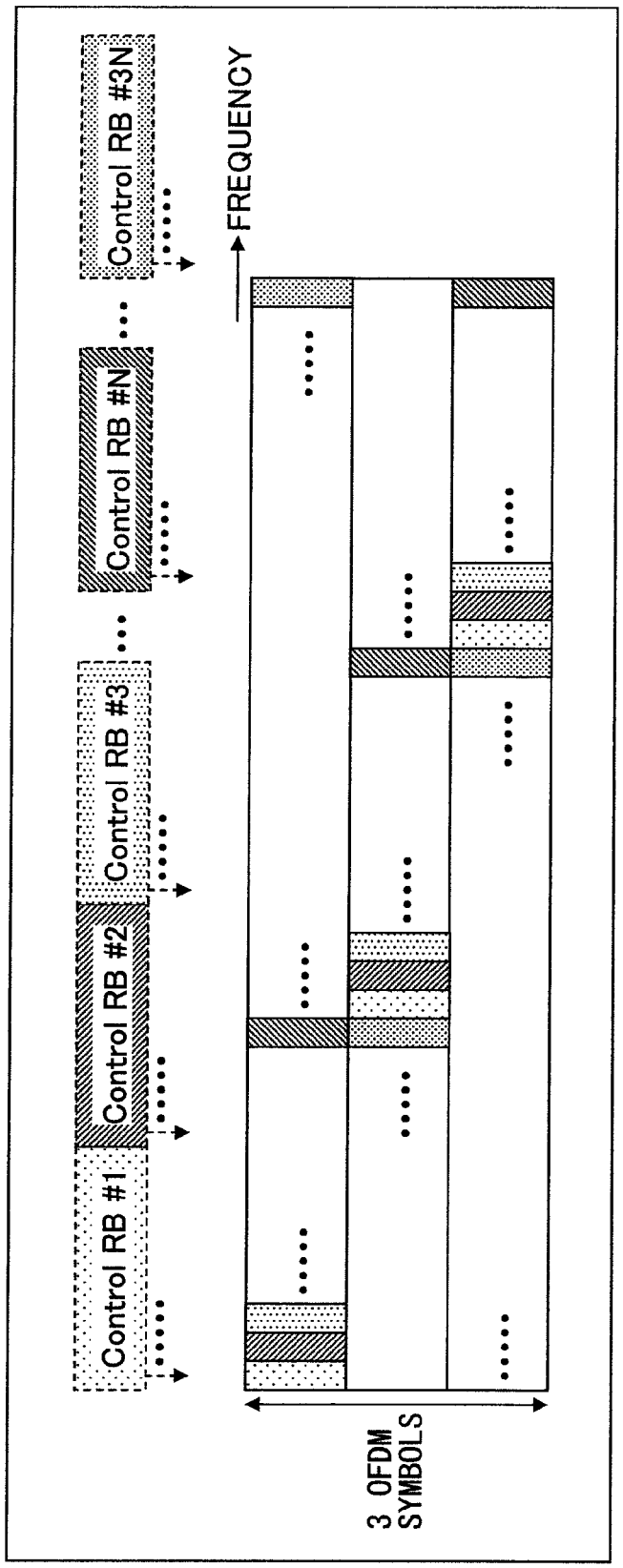
FIG. 14 is an explanatory diagram showing a multiplexing example of the L1/L2 control channel when a plurality of users are multiplexed.

FIG. 14 shows a multiplexing example of the L1/L2 control channel when multiplexing a plurality of users. The L1/L2 control channel is mapped within 3 OFDM symbols in each subframe.

For example, subcarriers assigned to the L1/L2 control channel form a plurality of control resource blocks. For example, one control resource block is formed by X subcarriers (X is an integer of 10. X>0). As the value X, an optimum value is prepared according to the system band and the like. FDM or hybrid of CDM and FDM is used for the plurality of control resource blocks. When a plurality of OFDM symbols are used for the L1/L2 control channel, the control resource block is mapped to every OFDM symbol. The number of control resource blocks is reported by the broadcast channel.

The L1/L2 control channel is data-modulated using QPSK or 16 QAM. When a plurality of coding rates are used (R1, R2, . . . , Rn), Rn is set to be R1/n. Even when the uplink scheduling information and the downlink scheduling information are different in the number of bits, control resource blocks of the same size are used by using rate matching.

Figure 15:
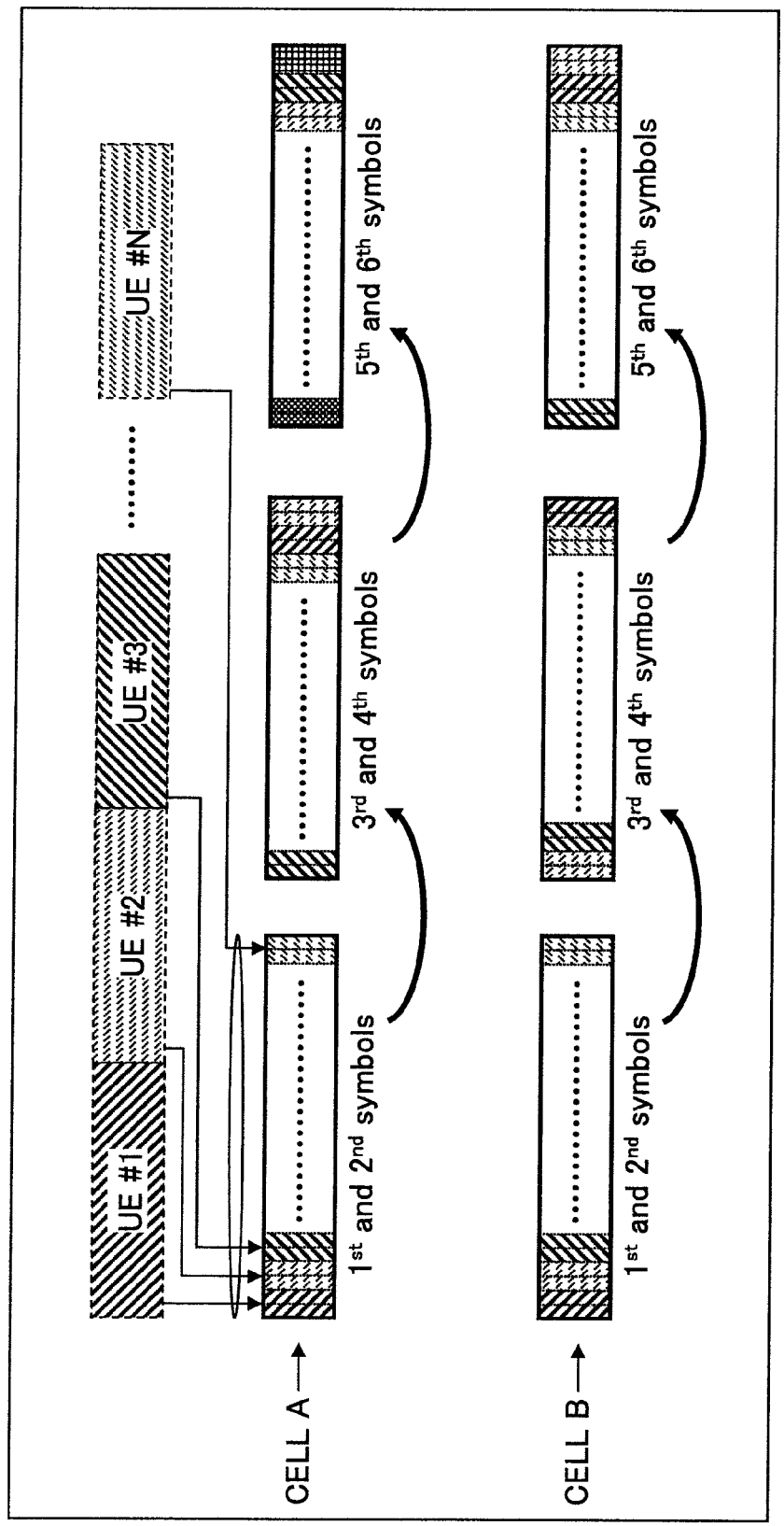
FIG. 15 is an explanatory diagram showing a mapping example of control channels of each user.

For example, by setting a shift amount of a start position for mapping symbols included in the control resource block to be different among cells, it can be realized to randomize interference among cells (sectors). An example is described with reference to FIG. 15. In cell A, first and second symbols included in the control resource block of each use are mapped in an order starting from user #1 (UE#1). Next, third and fourth symbols included in the control resource block of each user are shifted by an amount of two users, and are mapped in an order starting from the user #3 (UE#3). Next, fifth and sixth symbols included in the control resource block of each user are further shifted by an amount of two users, and are mapped in an order starting from the user #5 (UE#5). These are assigned in an order. For example, these are assigned in an ascending order of subcarrier number of the first OFDM symbol.

On the other hand, in cell B, first and second symbols included in the control resource block of each use are mapped in an order starting from user #1 (UE#1). Next, third and fourth symbols included in the control resource block of each user are shifted by an amount of one user, and are mapped in an order starting from the user #2 (UE#2). Next, fifth and sixth symbols included in the control resource block of each user are further shifted by an amount of one user, and are mapped in an order starting from the user #3 (UE#3).

Figure 16:
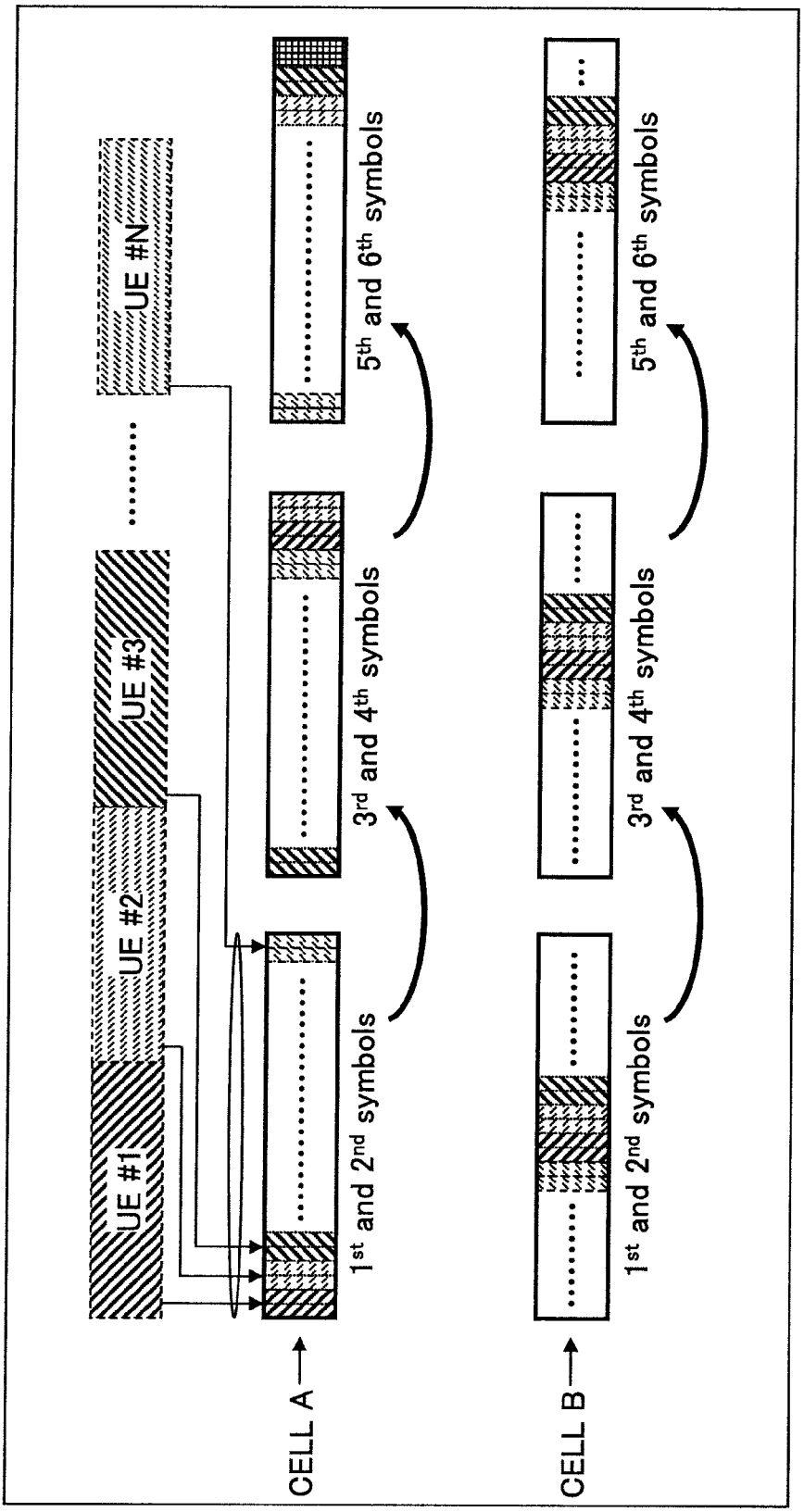
FIG. 16 is an explanatory diagram showing a mapping example of control channels of each user.

In addition, for example, as shown in FIG. 16, the shift amount of the start position of mapping of symbols included in the control resource block may be set to be different among cells, and further, subcarriers that are not used in neighbor cells my be used, so that interference can be coordinated.

Figure 17:
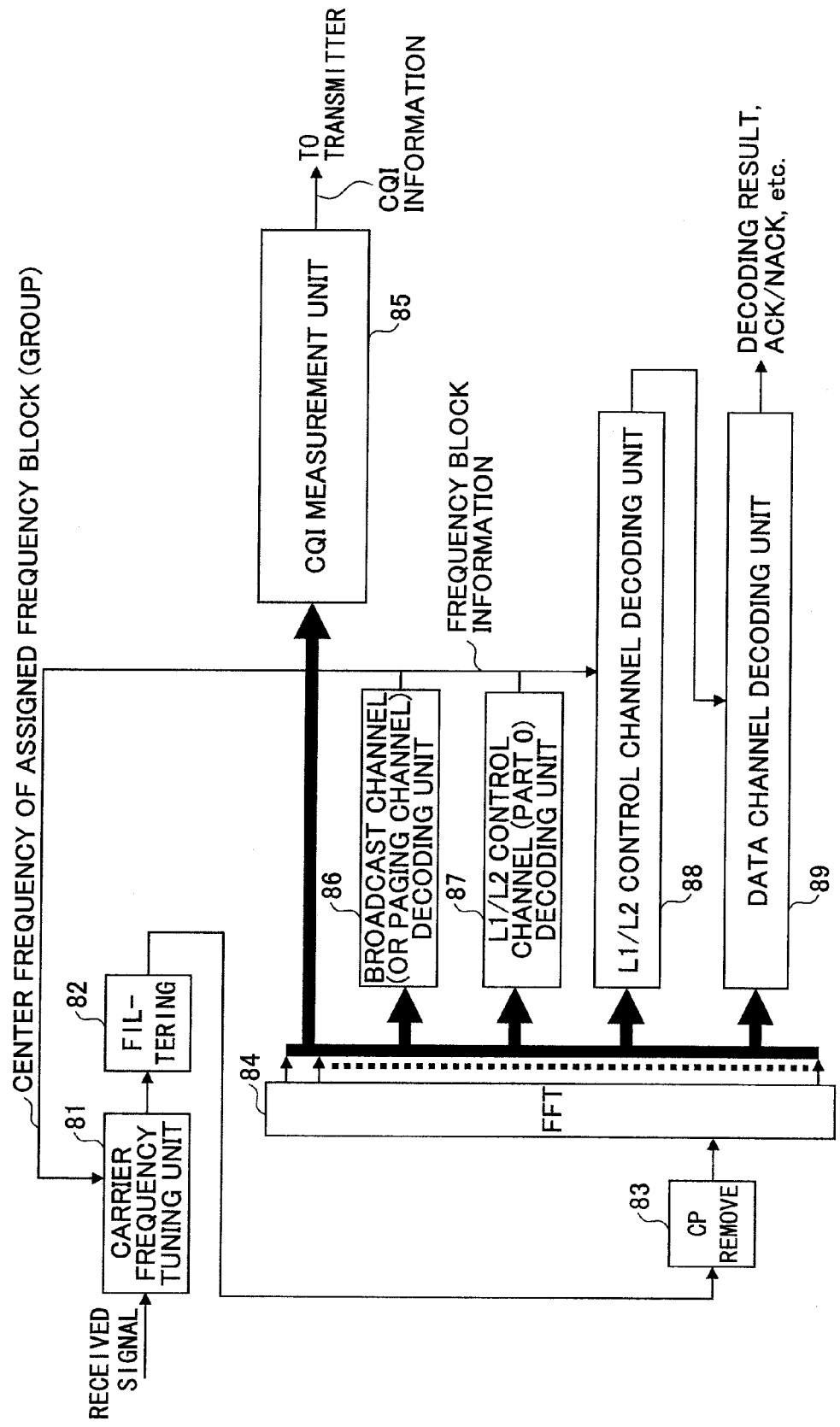
FIG. 17 is a partial block diagram showing a user apparatus of an embodiment of the present invention.

FIG. 17 shows a partial block diagram of the user apparatus $100_n$ used in an embodiment of the present invention. FIG. 17 shows a carrier frequency tuning unit 81, a filtering unit 82, a cyclic prefix (CP) removing unit 83, a fast Fourier transform unit (FFT) 84, a CQI measurement unit 85, a broadcast channel (or paging channel) decoding unit 86, a L1/L2 control channel (part 0) decoding unit 87, a L1/L2 control channel decoding unit 88 and a data channel decoding unit 89.

The carrier frequency tuning unit 81 properly adjusts the center frequency of a reception band in order to be able to receive a signal of a frequency block assigned to the terminal.

The filtering unit 82 filters the received signal.

The cyclic prefix removing unit 83 removes guard interval from the received signal, and extracts an effective symbol part from the received symbol.

The fast Fourier transform unit (FFT) 84 performs fast Fourier transform on information included in the effective symbol so as to perform demodulation of the OFDM scheme.

The CQI measurement unit 85 measures reception power level of the pilot channel included in the received signal, and feeds the measurement result back to the base station apparatus as channel state information CQI. CQI is measured for every resource block in the frequency block, and all of them are reported to the base station apparatus.

The broadcast channel (or paging channel) decoding unit 86 decodes a broadcast channel. When a paging channel is included, it is also decoded.

The L1/L2 control channel (part 0) decoding unit 87 decodes information of part 0 in the L1/L2 control channel. By using the part 0, the radio resource amount used for the L1/L2 control channel and the transmission format of the L1/L2 control channel can be recognized.

The L1/L2 control channel decoding unit 88 decodes the L1/L2 control channel included in the received signal to extract scheduling information. The scheduling information includes information indicating whether resource blocks are assigned to a shared data channel for the terminal, and includes information indicating resource block numbers if resource blocks are assigned. The L1/L2 control channel includes information of data modulation, channel coding rate and HARQ for the shared data channel.

The data channel decoding unit 89 decodes the shared data channel included in the received signal based on the information extracted from the L1/L2 control channel. Positive acknowledgement (ACK) or negative acknowledgement may be reported to the base station apparatus according to the decoding result.

Figure 18:
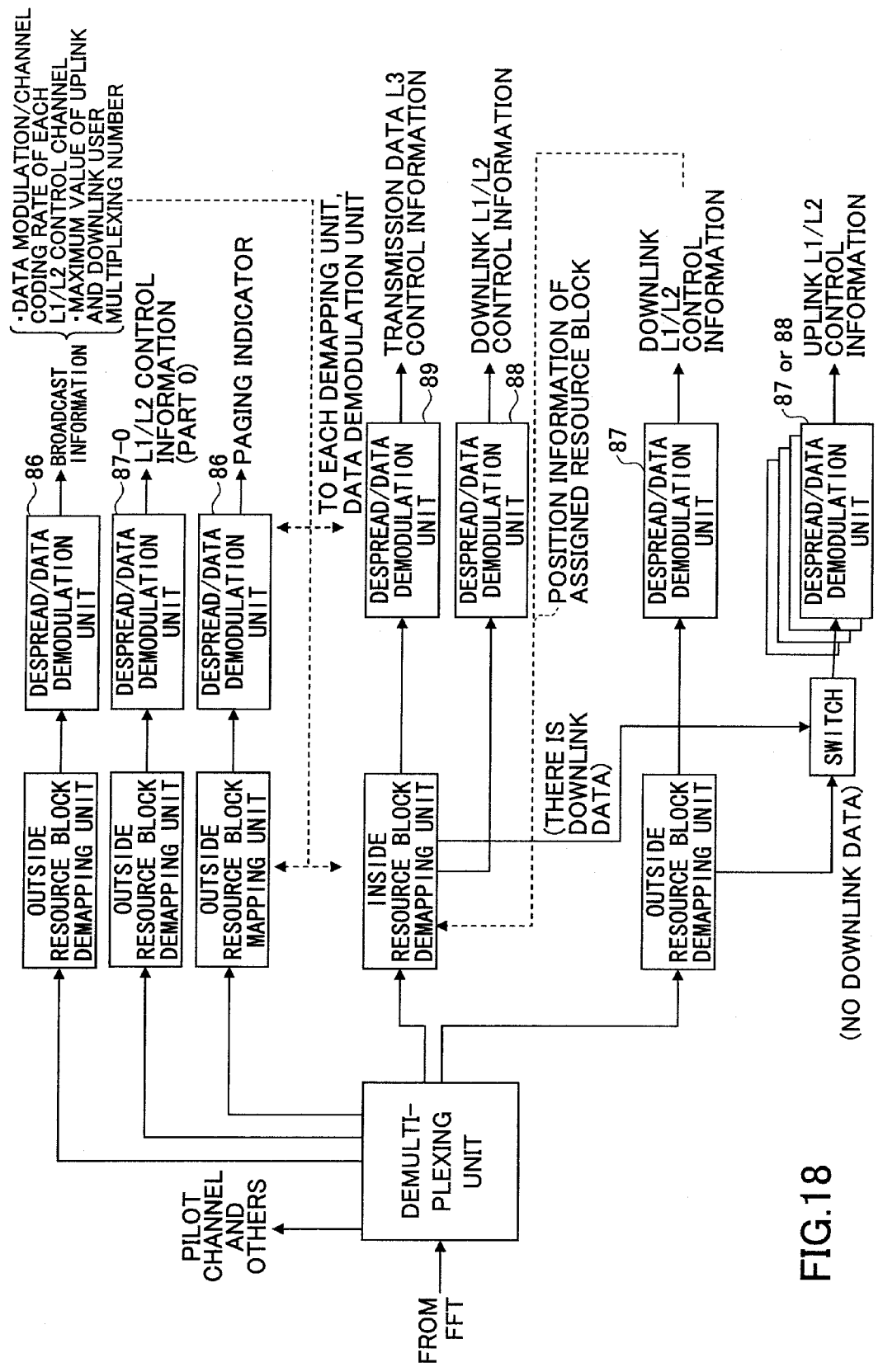
FIG. 18 is a partial block diagram showing a user apparatus of an embodiment of the present invention.

Like FIG. 17, FIG. 18 shows a partial block diagram of the user apparatus $100_n$. FIG. 18 appears to be different from FIG. 17 in that individual pieces of control information are shown more concretely. The same reference symbols indicate the same elements in FIGS. 17 and 18. In the figure, "inside resource block demapping" indicates extracting information mapped to one or more resource blocks assigned to a specific user apparatus $100_n$. The "outside resource block demapping" indicates extracting information mapped to the whole frequency blocks including many resource blocks.

For the sake of convenience of explanation, the present invention is described by using some embodiments. But, classification into each embodiment is not essential in the present invention, and equal to or more than two embodiments may be used as necessary. While specific numerical value examples are used to facilitate understanding of the present invention, such numerical values are merely examples, so that any appropriate value may be used unless specified otherwise.

As described above, while the present invention is described with reference to specific embodiments, the respective embodiments are merely exemplary, so that a skilled person will understand variations, modifications, alternatives, and replacements. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-121304, filed in the JPO on May 1, 2007, and the entire contents of the Japanese patent application No. 2007-121304 is incorporated herein by reference.

The invention claimed is:

1. A base station apparatus used in a mobile communication system to which an OFDM scheme is applied in downlink, comprising:
a scheduler configured to perform assignment of radio resources to a user apparatus for each subframe;
a control channel generation unit configured to generate a control channel for reporting a result of scheduling by the scheduler to the user apparatus; and
a mapping unit configured to map the control channel and a data channel,
wherein control information includes information indicating a radio resource amount used for the control channel,
the mapping unit maps the control channel to a predetermined number of OFDM symbols from the start of a subframe formed by plural OFDM symbols, and maps the control information to subcarriers in a first OFDM symbol of the subframe such that the subcarriers do not overlap between cells in a frequency domain,
two antenna transmission is performed by space frequency block coding,
the control information is mapped to consecutive two subcarriers, and a control block of each user is mapped to an OFDM symbol within three OFDM symbols in which the control channel is mapped.

2. The base station apparatus as claimed in claim 1, wherein the control information is mapped to a subcarrier other than subcarriers to which a reference signal is mapped.

3. The base station apparatus as claimed in claim 1, wherein
the mapping unit shifts and maps the control block of each user in each OFDM symbol.

4. The base station apparatus as claimed in claim 3, wherein
the shift amount is different for each cell.

5. The base station apparatus as claimed in claim 1, wherein the mapping unit maps the control block of each user to a subcarrier which is not used in neighbor cells in each OFDM symbol.

6. A communication control method in a base station apparatus used in a mobile communication system to which an OFDM scheme is applied in downlink, comprising:
a scheduling step of performing assignment of radio resources to a user apparatus for each subframe;
a control channel generation step of generating a control channel for reporting a result of scheduling of the scheduling step to the user apparatus; and
a mapping step of mapping the control channel and a data channel,
wherein, in the mapping step, the base station apparatus maps the control channel to a predetermined number of OFDM symbols from the start of a subframe formed by plural OFDM symbols, and maps control information to subcarriers in a first OFDM symbol of the subframe such that the subcarriers do not overlap between cells in a frequency domain, the control information including information indicating a radio resource amount used for the control channel,
two antenna transmission is performed by space frequency block coding,
the control information is mapped to consecutive two subcarriers, and
a control block of each user is mapped to an OFDM symbol within three OFDM symbols in which the control channel is mapped.

7. A base station apparatus used in a mobile communication system to which an OFDM scheme is applied in downlink, comprising:
a data channel generation unit configure to generate a data channel;
a control channel generation unit configured to generate a control channel that includes at least assignment information of the data channel generated in the data channel generation unit;
a part 0 information generation unit configured to generate part 0 information that includes information indicating the number of OFDM symbols used for the control channel generated in the control channel generation unit;
a mapping unit configured to map the part 0 information generated in the part 0 information generation unit, the control channel generated in the control channel generation unit, and the data channel generated in the data channel generation unit,
wherein the mapping unit maps the control channel to a predetermined number of OFDM symbols from the start of a subframe formed by plural OFDM symbols, and maps the part 0 information to subcarriers in a first OFDM symbol of the subframe such that the subcarriers do not overlap between cells in a frequency domain,
two antenna transmission is performed by space frequency block coding, and
the part 0 information generated in the part 0 information generation unit is mapped to consecutive two subcarriers.

8. The base station apparatus as claimed in claim 7, wherein a modulation scheme for the part 0 information generated in the part 0 information generation unit is kept constant, and transmission power for the part 0 information is controlled to be variable.

9. The base station apparatus as claimed in claim 7, wherein the mapping unit maps the part 0 information to a subcarrier other than the subcarriers to which a reference signal is mapped.

10. The base station apparatus as claimed in claim 7, wherein the mapping unit maps the control channel of each user apparatus within three OFDM symbols from the start of a subframe, and shifts and maps control information of each user apparatus in each OFDM symbol.

11. The base station apparatus as claimed in claim 10, wherein the shift amount is different for each cell.

12. The base station apparatus as claimed in claim 7, wherein the mapping unit maps the control channel of each user apparatus within three OFDM symbols from the start of a subframe, and maps control information of each user to a subcarrier which is not used in neighbor cells in each OFDM symbol.

13. A transmission method in a base station apparatus used in a mobile communication system to which an OFDM scheme is applied in downlink, comprising:
a step of generating a data channel;
a step of generating a control channel that includes at least assignment information of the data channel;
a step of generating part 0 information that includes information indicating the number of OFDM symbols used for the control channel;
a step of mapping the part 0 information, the control channel, and the data channel,
wherein, in the mapping step, the base station apparatus maps the control channel to a predetermined number of OFDM symbols from the start of a subframe formed by plural OFDM symbols, and maps the part 0 information to the subcarriers in a first OFDM symbol of the subframe such that the subcarriers do not overlap between cells in a frequency domain,
two antenna transmission is performed by space frequency block coding, and
the part 0 information generated in the step of generating the part 0 information is mapped to consecutive two subcarriers.

* * * * *